United States Patent
Kishiyama et al.

(10) Patent No.: US 9,813,996 B2
(45) Date of Patent: Nov. 7, 2017

(54) RADIO COMMUNICATION METHOD, LOCAL AREA BASE STATION APPARATUS, MOBILE TERMINAL APPARATUS AND RADIO COMMUNICATION SYSTEM

(71) Applicant: NTT DOCOMO, INC., Tokyo (JP)

(72) Inventors: Yoshihisa Kishiyama, Tokyo (JP); Anass Benjebbour, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 63 days.

(21) Appl. No.: 14/390,405

(22) PCT Filed: Apr. 4, 2013

(86) PCT No.: PCT/JP2013/060311
§ 371 (c)(1),
(2) Date: Oct. 3, 2014

(87) PCT Pub. No.: WO2013/151127
PCT Pub. Date: Oct. 10, 2013

(65) Prior Publication Data
US 2015/0045085 A1     Feb. 12, 2015

(30) Foreign Application Priority Data

Apr. 6, 2012   (JP) ................................. 2012-087672

(51) Int. Cl.
*H04W 52/24*     (2009.01)
*H04W 16/18*     (2009.01)
(Continued)

(52) U.S. Cl.
CPC ......... *H04W 52/242* (2013.01); *H04W 16/18* (2013.01); *H04W 24/02* (2013.01);
(Continued)

(58) Field of Classification Search
CPC .... H04L 5/0053; H04L 5/0007; H04L 5/0037
See application file for complete search history.

(56) References Cited

U.S. PATENT DOCUMENTS 6,351,649 B1   2/2002   Watanabe et al.
8,538,342 B2   9/2013   Morita et al.
(Continued)

FOREIGN PATENT DOCUMENTS

GB   2353439 A      2/2001
JP   2003-179981 A  6/2003
(Continued)

OTHER PUBLICATIONS

International Search Report for corresponding International Application No. PCT/JP2013/060311, dated May 7, 2013 (2 pages).
(Continued)

*Primary Examiner* — Bobbak Safaipour
(74) *Attorney, Agent, or Firm* — Osha Liang LLP

(57) ABSTRACT

A method for making the uplink and downlink coverages in a local area symmetrical by executing transmission power control in the downlink of a local area in HetNet is disclosed. A radio communication method is provided in which a local area base station apparatus, arranged in a wide area where a first carrier frequency is used and forming a local area that is narrower than the wide area, transmits a downlink signal, using a second carrier frequency, which belongs to a different frequency band from the first carrier frequency and which has a wider bandwidth than the first carrier frequency, the local area base station apparatus transmits a detection signal that is used to detect the local area base station apparatus in the mobile terminal apparatus, and the local area base station apparatus transmits the downlink signal for the mobile terminal apparatus with transmission power that is determined.

9 Claims, 15 Drawing Sheets

(51) Int. Cl.
  *H04W 24/02* (2009.01)
  *H04W 52/14* (2009.01)
  *H04W 52/32* (2009.01)
  *H04W 16/32* (2009.01)
  *H04W 48/10* (2009.01)
  *H04W 52/50* (2009.01)
  *H04B 17/318* (2015.01)

(52) U.S. Cl.
  CPC .......... *H04B 17/318* (2015.01); *H04W 16/32* (2013.01); *H04W 48/10* (2013.01); *H04W 52/143* (2013.01); *H04W 52/146* (2013.01); *H04W 52/247* (2013.01); *H04W 52/325* (2013.01); *H04W 52/50* (2013.01)

(56) References Cited

U.S. PATENT DOCUMENTS

| | | | | |
|---|---|---|---|---|
| 9,198,181 | B2* | 11/2015 | Blankenship | H04W 72/042 |
| 2007/0165589 | A1* | 7/2007 | Sakoda | H04W 48/08 |
| | | | | 370/345 |
| 2008/0188266 | A1* | 8/2008 | Carter | H04W 16/10 |
| | | | | 455/561 |
| 2009/0110405 | A1* | 4/2009 | Lee | H04B 10/116 |
| | | | | 398/130 |
| 2009/0291690 | A1* | 11/2009 | Guvenc | H04W 16/10 |
| | | | | 455/444 |
| 2010/0118730 | A1* | 5/2010 | Tanaka | H04L 1/0028 |
| | | | | 370/252 |
| 2011/0176497 | A1* | 7/2011 | Gopalakrishnan | H04J 11/0053 |
| | | | | 370/329 |
| 2011/0268101 | A1* | 11/2011 | Wang | H04L 5/0053 |
| | | | | 370/344 |
| 2011/0282989 | A1* | 11/2011 | Geirhofer | H04L 67/104 |
| | | | | 709/224 |
| 2012/0269072 | A1* | 10/2012 | Wu | H04W 52/383 |
| | | | | 370/242 |
| 2012/0289178 | A1* | 11/2012 | Matsumura | H04W 52/0206 |
| | | | | 455/403 |
| 2012/0320820 | A1 | 12/2012 | Yuda et al. | |
| 2013/0114529 | A1* | 5/2013 | Chen | H04L 1/1812 |
| | | | | 370/329 |
| 2013/0195019 | A1* | 8/2013 | Lindh | H04L 5/001 |
| | | | | 370/329 |
| 2015/0045085 | A1* | 2/2015 | Kishiyama | H04W 52/242 |
| | | | | 455/522 |
| 2015/0078325 | A1* | 3/2015 | Kishiyama | H04W 76/026 |
| | | | | 370/330 |
| 2016/0073389 | A1* | 3/2016 | Kishiyama | H04L 5/005 |
| | | | | 370/329 |
| 2016/0183173 | A1* | 6/2016 | Harada | H04W 48/12 |
| | | | | 455/434 |
| 2016/0183325 | A1* | 6/2016 | Harada | H04W 16/32 |
| | | | | 370/328 |

FOREIGN PATENT DOCUMENTS

| | | |
|---|---|---|
| JP | 2006510260 A | 3/2006 |
| JP | 2011-142579 A | 7/2011 |
| JP | 2012-54996 A | 3/2012 |
| JP | 2012-60495 A | 3/2012 |
| JP | 2012-070274 A | 4/2012 |
| WO | 9708911 A1 | 3/1997 |
| WO | 2004/054135 A1 | 6/2004 |
| WO | 2008/042187 A2 | 4/2008 |
| WO | 2008/042187 A3 | 12/2008 |
| WO | 2009/119212 A1 | 10/2009 |
| WO | 2011100652 A1 | 8/2011 |
| WO | 2011100653 A1 | 8/2011 |
| WO | 2011114729 A1 | 9/2011 |

OTHER PUBLICATIONS

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8);" Dec. 2008 (18 pages).
Extended European Search Report issued in the counterpart European Patent Application No. 13772050.4, dated Oct. 5, 2015 (9 pages).
Extended Search Report issued in corresponding European Application No. 16164210.3, dated Aug. 1, 2016 (9 pages).
Office Action dated Dec. 27, 2016, in corresponding Japanese Patent Application No. 2016-017274 (8 pages).
Samsung, 3GPP TSG RAN WG1 #63, "Details of CQI definition for LTE-A," R1-106034, Jacksonville, USA, Nov. 15-19, 2010 (9 pages).
Huawei, HiSilicon, 3GPP TSG RAN WG1 meeting #62bis, "Remaining issues on CSI RS signalling," R1-105131, Xi'an, China, Oct. 11-15, 2010 (12 pages).
Search Report issued in the counterpart Japanese Patent Application No. 2016-017273, dated Jan. 24, 2017 (10 pages).
NTT Docomo; "Issues Regarding Additional Carrier Type in Rel-11 CA"; 3GPP TSG RAN WG1 Meeting #67, R1-114071; San Francisco, USA; Nov. 14-18, 2011 (5 pages).
Office Action issued in corresponding Japanese Application No. 2012-087672, dated Dec. 1, 2015 (13 pages).
Office Action issued in corresponding Japanese Application No. 2012-087672, dated Mar. 20, 2016 (2 pages).
Office Action issued in the counterpart European Patent Application No. 16164210.3, dated Jun. 14, 2017 (7 pages).

* cited by examiner

| | WIDE AREA | LOCAL AREA |
|---|---|---|
| SPECTRUM EFFICIENCY | VERY IMPORTANT (LIMITED BW) | IMPORTANT (MAY NOT BE CRITICAL IF LARGE BW AVAILABLE) |
| MOBILITY | MEDIUM-TO-HIGH | LOW |
| COVERAGE | ESSENTIAL | WIDER IS BETTER |
| DL/UL RADIO LINKS | ASYMMETRIC | MORE SYMMETRIC |
| TRAFFIC LOAD | MORE UNIFORM (MANY USERS & CELL PLANNING) | MORE FLUCTUATED (LESS USERS & NON-UNIFORM DEPLOYMENTS) |

FIG.5

RADIO COMMUNICATION METHOD, LOCAL AREA BASE STATION APPARATUS, MOBILE TERMINAL APPARATUS AND RADIO COMMUNICATION SYSTEM

TECHNICAL FIELD

The present invention relates to a radio communication method, a local area base station apparatus, a mobile terminal apparatus and a radio communication system in a next-generation mobile communication system in which local areas are arranged in a wide area.

BACKGROUND ART

In a UMTS (Universal Mobile Telecommunications System) network, long-term evolution (LTE) is under study for the purposes of further increasing high-speed data rates, providing low delay, and so on (non-patent literature 1). In LTE, as multiple access schemes, a scheme that is based on OFDMA (Orthogonal Frequency Division Multiple Access) is used in downlink channels (the downlink), and a scheme that is based on SC-FDMA (Single Carrier Frequency Division Multiple Access) is used in uplink channels (the uplink).

Also, successor systems of LTE (referred to as, for example, "LTE-Advanced" or "LTE enhancement" (hereinafter referred to as "LTE-A")) are under study for the purpose of achieving further broadbandization and increased speed beyond LTE. In LTE-A (Rel-10), carrier aggregation to group a plurality of component carriers (CCs), where the system band of the LTE system is one unit, for broadbandization, is used. In LTE-A, a HetNet (Heterogeneous Network) configuration to use an interference coordination technique (eICIC: enhanced Inter-Cell Interference Coordination) is under study.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

Now, in cellular systems such as W-CDMA, LTE (Rel. 8), and successor systems of LTE (for example, Rel. 9 and Rel. 10), the radio communication schemes (radio interfaces) are designed to support wide areas. In the future, it is expected that high-speed wireless services by means of near-field communication will be provided in local areas such as indoors, shopping malls and so on, in addition to cellular environment such as given above. Consequently, there is a demand to design new radio communication schemes that are specifically designed for local areas, so that capacity can be secured with local areas while coverage is secured with a wide area.

The present invention has been made in view of the above, and it is therefore an object of the present invention to provide a radio communication method, a local area base station apparatus, a mobile terminal apparatus and a radio communication system that can provide highly efficient local area radio access.

Solution to Problem

The radio communication method according to the present invention is a radio communication method in which a local area base station apparatus, arranged in a wide area where a first carrier frequency is used and forming a local area that is narrower than the wide area, transmits a downlink signal, using a second carrier frequency, which belongs to a different frequency band from the first carrier frequency and which has a wider bandwidth than the first carrier frequency, and this radio communication method includes the steps in which: the local area base station apparatus transmits a detection signal that is used to detect the local area base station apparatus in the mobile terminal apparatus; and the local area base station apparatus transmits the downlink signal for the mobile terminal apparatus with transmission power that is determined based on a path loss of the detection signal received in the mobile terminal apparatus.

The local area base station apparatus according to the present invention is a local area base station apparatus that is arranged in a wide area where a first carrier frequency is used and that forms a local area, which is narrower than the wide area, the local area base station apparatus and this local area base station apparatus has: a downlink signal transmission section that transmits a downlink signal, using a second carrier frequency, which belongs to a different frequency band from the first carrier frequency and which has a wider bandwidth than the first carrier frequency; and a detection signal transmission section that transmits a detection signal that is used to detect the local area base station apparatus in the mobile terminal apparatus, and the downlink signal transmission section transmits the downlink signal for the mobile terminal apparatus with transmission power determined based on a path loss of the detection signal received in the mobile terminal apparatus.

The mobile terminal apparatus according to the present invention is a mobile terminal apparatus that receives, from a local area base station apparatus arranged in a wide area where a first carrier frequency is used and forming a local area that is narrower than the wide area, a downlink signal, using a second carrier frequency, which belongs to a different frequency band from the first carrier frequency and which has a wider bandwidth than the first carrier frequency, and this mobile terminal apparatus has: a detection signal receiving section that receives, from the local area base station apparatus, a detection signal that is used to detect the local area base station apparatus in the mobile terminal apparatus; and a downlink signal receiving section that receives the downlink signal transmitted from the local area base station apparatus with transmission power determined based on a path loss of the detection signal.

The radio communication system according to the present invention is a radio communication system in which a local area base station apparatus, arranged in a wide area where a first carrier frequency is used and forming a local area that is narrower than the wide area, transmits a downlink signal, using a second carrier frequency, which belongs to a different frequency band from the first carrier frequency and which has a wider bandwidth than the first carrier frequency, and, in this radio communication system: the local area base station apparatus transmits a detection signal that is used to detect the local area base station apparatus in the mobile terminal apparatus; and the local area base station apparatus transmits the downlink signal for the mobile terminal apparatus with transmission power that is determined based on a path loss of the detection signal received in the mobile terminal apparatus.

Technical Advantage of the Invention

According to the present invention, it is possible to provide a radio communication method, a local area base station apparatus, a mobile terminal apparatus and a radio communication system that can provide highly efficient local area radio access. In particular, by executing transmission power control on the downlink of a local area, it is possible to make the uplink and downlink coverages in the local area nearly symmetrical.

BRIEF DESCRIPTION OF DRAWINGS

FIG. 5 shows a table to list differences between a wide area and a local area;

DESCRIPTION OF EMBODIMENTS

Figure 1:
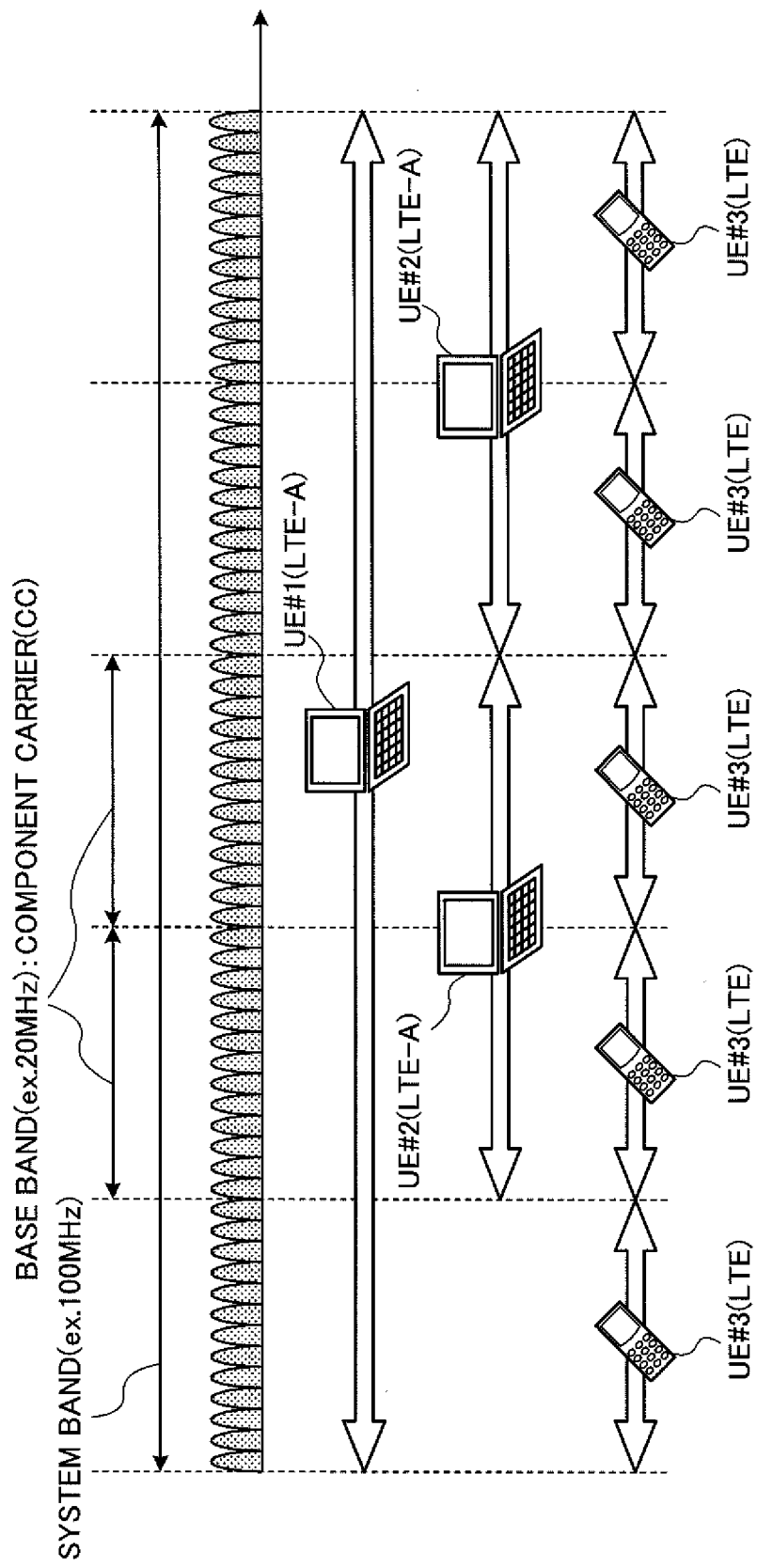
FIG. 1 is a diagram to explain a system band in an LTE-A system.

FIG. 1 is a diagram to show a layered bandwidth configuration defined in LTE-A. The example shown in FIG. 1 is a layered bandwidth configuration that is assumed when an LTE-A system having a first system band formed with a plurality of fundamental frequency blocks (hereinafter referred to as "component carriers"), and an LTE system having a second system band formed with one component carrier, coexist. In the LTE-A system, for example, radio communication is performed in a variable system bandwidth of 100 MHz or below, and, in the LTE system, for example, radio communication is performed in a variable system bandwidth of 20 MHz or below. The system band of the LTE-A system includes at least one component carrier, where the system band of the LTE system is one unit. Widening the band by way of gathering a plurality of component carriers in this way is referred to as "carrier aggregation."

For example, in FIG. 1, the system band of the LTE-A system is a system band to include bands of five component carriers (20 MHz×5=100 MHz), where the system band (base band: 20 MHz) of the LTE system is one component carrier. In FIG. 1, mobile terminal apparatus UE (User Equipment) #1 is a mobile terminal apparatus to support the LTE-A system (and also support the LTE system), and is able to support a system band up to 100 MHz. UE #2 is a mobile terminal apparatus to support the LTE-A system (and also support the LTE system), and is able to support a system band up to 40 MHz (20 MHz×2=40 MHz). UE #3 is a mobile terminal apparatus to support the LTE system (and not support the LTE-A system), and is able to support a system band up to 20 MHz (base band).

Figure 2:
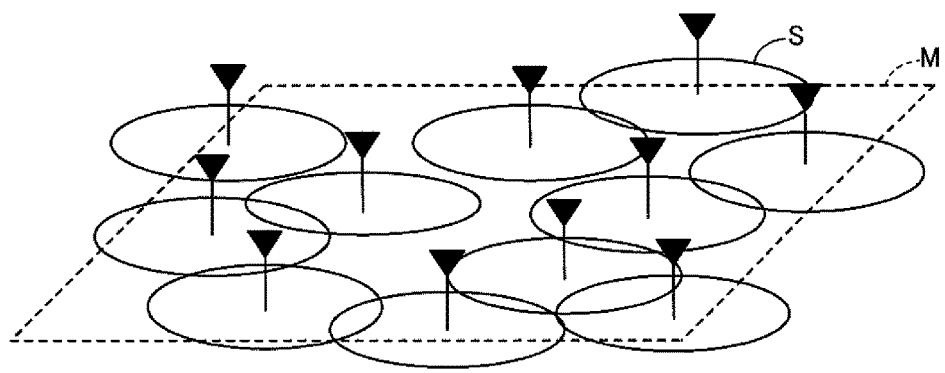
FIG. 2 is a diagram to show a configuration to arrange many small cells in a macro cell.

Now, future systems may anticipate a configuration to arrange numerous small cell S's in a macro cell, just as shown in FIG. 2. In this case, the small cell S's need to be designed taking into account capacity versus network costs. The network costs may include, for example, the cost of installing the network nodes, backhaul link and so on, the operation cost for cell planning and maintenance support, the power consumption on the network side, and so on. Also, as demands apart from capacity, small cell S's are required to support saved power consumption on the mobile terminal apparatus side, random cell planning, and so on.

Figure 3A:
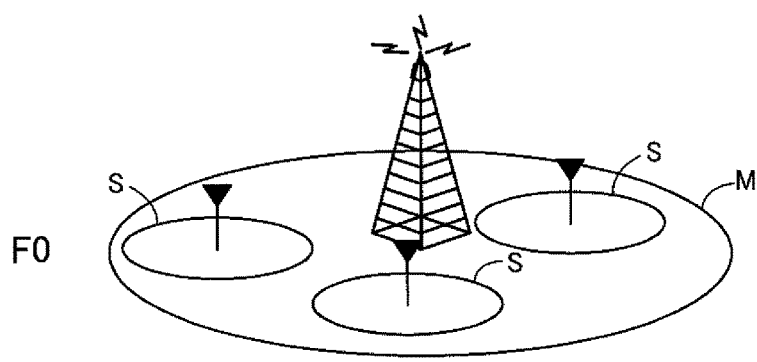
FIG. 3 provides diagrams to show two kinds of heterogeneous network configurations.
Figure 3B:
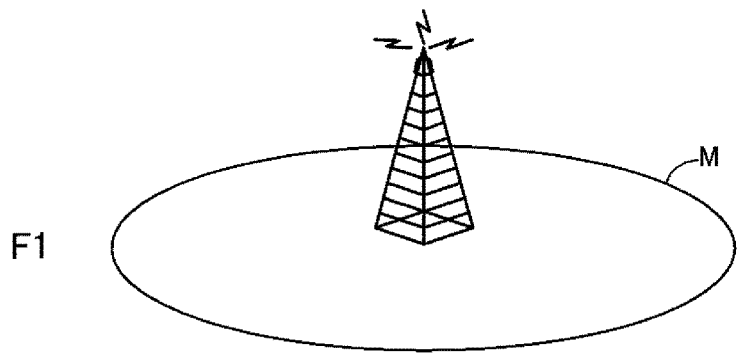
Figure 3B:
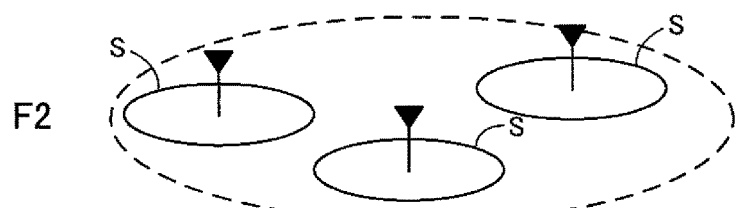

When small cells are arranged in a macro cell M, two kinds of heterogeneous network (hereinafter referred to as "HetNet") configurations may be possible, as shown in FIGS. 3A and 3B. In the first HetNet configuration shown in FIG. 3A, the small cell S's are arranged such that the macro cell M and the small cell S's use the same carrier frequency. In the second HetNet configuration shown in FIG. 3B, the small cell S's are arranged such that the macro cell M and the small cell S's use different carrier frequencies. In the second HetNet configuration, the small cell S's use a dedicated carrier frequency, so that it is possible to secure coverage with the macro cell M and secure capacity with the small cell S's. It is expected that, in the future (Rel. 12 and later versions), this second HetNet configuration will become more important.

An example of carriers used in the second HetNet configuration will be described with reference to FIG. 4. In the following, the macro cell M and small cell S's in FIG. 3B will be referred to as "the wide area" and "the local areas," respectively. The wide area may be a sector and so on, besides a macro cell, and the local areas may be pico cells, nano cells, femto cells, micro cells and so on, besides small cells. The radio base stations to cover (referred to as "coverage range") the wide area and the local areas will be referred to as the wide area base station apparatus and the local area base station apparatuses, respectively.

Figure 4:
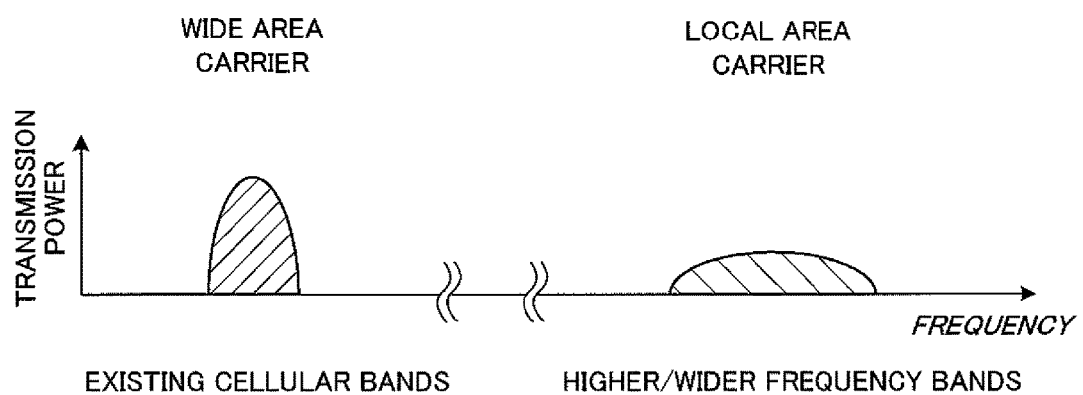
FIG. 4 is a diagram to show carriers used in a wide area and a local area.

As shown in FIG. 4, the carrier that is used in the wide area in the second HetNet configuration (hereinafter referred to as "the wide area carrier") is an existing carrier wave having a relatively narrow bandwidth (for example, 2 MHz) in a predetermined frequency band. The wide area carrier is transmitted with relatively high transmission power so that a large and wide area can be covered. This wide area carrier is also referred to as a legacy carrier, a coverage carrier and so on.

The carrier that is used in the local areas in the second HetNet configuration (hereinafter referred to as "the local area carrier") is a carrier wave having a relatively wide bandwidth (for example, 3.5 GHz) in a different frequency band from that of the wide area carrier (in FIG. 4, in a frequency band higher than that of the wide area carrier). The local area carrier has a wide bandwidth for improved capacity, and therefore is transmitted with relatively low transmission power. This local area carrier is also referred to as an additional carrier, an extension carrier, a capacity carrier and so on.

In this second HetNet configuration, as shown in FIG. 5, it is likely that the wide area and the local areas have different requirements and so on. For example, the wide area has a limited bandwidth, so that spectral efficiency is very important. By contrast with this, with the local areas, it is easy to take a wide bandwidth, so that, if a wide bandwidth can be secured, the significance of spectral efficiency is not as high as in the wide area. While the wide area needs to support high mobility such as represented by cars and/or the like, the local areas have only to support low mobility. The wide area needs to secure wide coverage. Although it is preferable to secure wide coverage with the local areas as well, the wide area can cover up the shortage of coverage.

In the wide area, significant capacity differences exist between the wide area base station apparatus and a mobile terminal apparatus, so that the difference in the maximum transmission power between the uplink and the downlink grows, and the uplink and the downlink have asymmetrical transmission power. In the local areas, there are only insignificant capacity differences between the local area base station apparatuses and a mobile terminal apparatus, so that the difference of the maximum transmission power between the uplink and the downlink becomes smaller, and the uplink and the downlink have nearly symmetrical transmission power. Furthermore, in the wide area, the number of connecting users per cell is high and cell planning is applied, so that there is little variation of traffic. By contrast with this, in the local areas, the number of connecting users per cell is low, and furthermore there is a possibility that cell planning is not applied, so that there is significant variation of traffic. In this way, since optimal requirements for the local areas are different from those of the wide area, it is necessary to design radio communication schemes that are specifically designed for the local areas.

Figure 6:
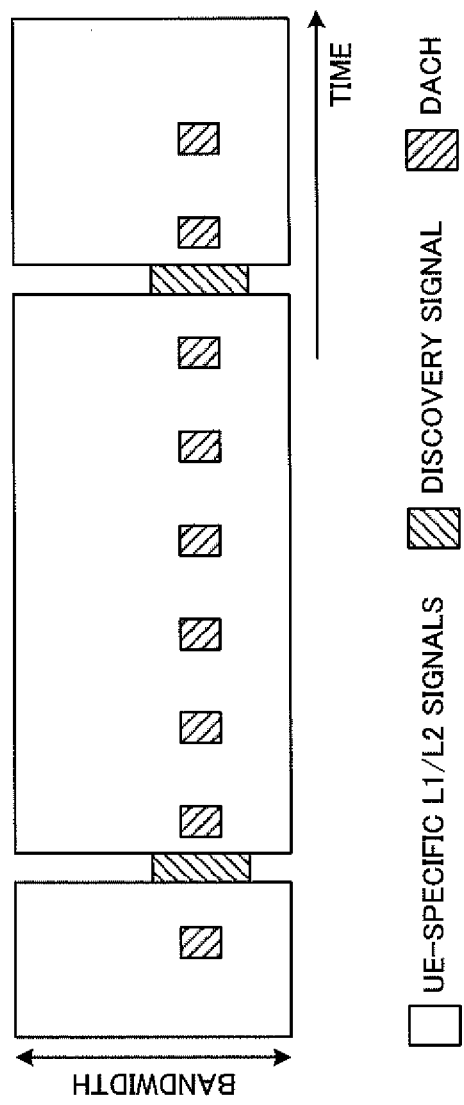
FIG. 6 is a diagram to show an arrangement configuration of the discovery signals and DACH.

Considering interference that arises from saved power consumption and random cell planning, it is preferable to configure the radio communication scheme for the local areas to assume non-transmission when there is no traffic. Consequently, as shown in FIG. 6, the radio communication scheme for the local areas is expected to be designed as UE-specific as possible. To be more specific, the radio communication scheme for the local areas is designed based on the EPDCCH (Enhanced Physical Downlink Control Channel), the PDSCH (Physical Downlink Shared Channel), and the DM-RS (DeModulation-Reference Signal), without using cell-specific signals such as the PSS/SSS (Primary Synchronization Signal/Secondary Synchronization Signal), the CRS (Cell-specific Reference Signal), the PDCCH (Physical Downlink Control Channel) in LTE.

Here, the EPDCCH (enhanced downlink control signal) refers to a downlink control signal that is frequency-division-multiplexed with the PDSCH (downlink data signal). Like the PDSCH, the EPDCCH is demodulated using the DM-RS, which is a user-specific demodulation reference signal. Note that the EPDCCH may be referred to as an FDM-type PDCCH or may be referred to as a UE-PDCCH.

In FIG. 6, the PDSCH, the EPDCCH, the DM-RS and so on are shown as the UE-specific L1/L2 signals.

Also, in the radio communication scheme for the local areas, as shown in FIG. 6, in addition to defining discovery signals on the downlink, defining the DACH (Direct Access Channel) on the uplink is also under study. Here, the discovery signals refers to detection signals that are used to allow a mobile terminal apparatus to detect the local area base station apparatuses. Also, the DACH refers to a dedicated access channel for the local area base station apparatuses. By means of the DACH, the received power of discovery signals at a mobile terminal apparatus and so on are transmitted.

As shown in FIG. 6, downlink discovery signals are transmitted in a relatively long cycle (for example, on the order of several seconds), so that a mobile terminal apparatus is able to reduce the number of times of measurement and save battery. As for the uplink DACH, radio resources are allocated in a shorter cycle than discovery signals. By means of this, uplink connection is established quickly when traffic is produced in the mobile terminal apparatus.

The signal arrangement shown in FIG. 6 is simply an example and is by no means limiting. For example, it is equally possible to allocate radio resources to the DACH in the same cycle as discovery signals (for example, in a cycle of several seconds). Also, a discovery signal may be referred to as the PDCH (Physical Discovery Channel), the BS (Beacon Signal), the DPS (Discovery Pilot Signal) and so on. The DACH is not limited to a particular name.

Figure 7:
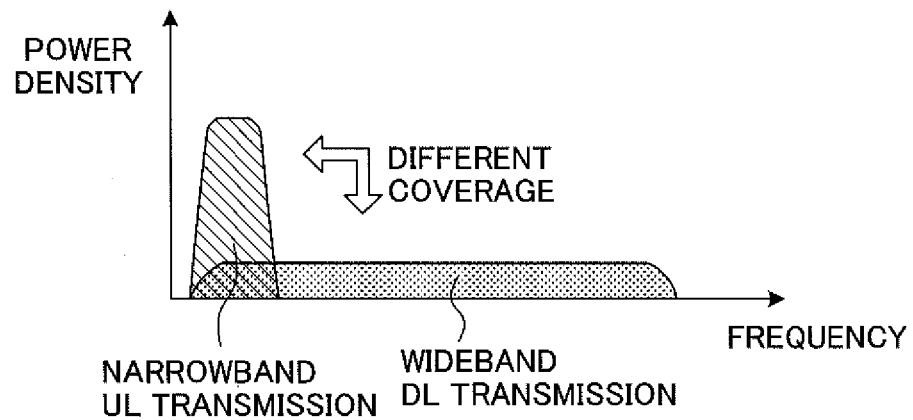
FIG. 7 is a diagram to explain the uplink and downlink coverages of a local area.

In the local areas of the second HetNet configuration such as ones described above, cases might occur where the uplink and downlink coverages becomes asymmetrical. As has been described with reference to FIG. 5, in a local area, differences between the local area base station apparatus and a mobile terminal apparatus in terms of capacity are insignificant, so that the difference of the maximum transmission power between the uplink and the downlink becomes small, and, generally, the uplink and the downlink have nearly symmetrical transmission power. However, as shown in FIG. 7, in the uplink of a local are, it is possible to execute transmission power control to narrow the bandwidth of the local area carrier shown in FIG. 4 and increase the transmission power. As a result of this, as shown in FIG. 7, there is a problem that the uplink transmission power becomes obviously bigger than the downlink transmission power and makes the uplink and downlink coverages in the local area asymmetrical.

So, the present inventors have arrived at the present invention to prevent the uplink and downlink coverages from being asymmetrical in a local area, where the transmission power difference between the local area base station apparatus and a mobile terminal apparatus is insignificant, and where the uplink and the downlink generally have nearly symmetrical transmission power. That is, a gist of the present invention is to execute, even in the downlink of a local area, transmission power control to narrow the bandwidth of the local area carrier shown in FIG. 4 and increase the transmission power, so that the uplink and downlink coverages in the local area become nearly symmetrical.

Now, the transmission power control scheme in the downlink of a local area according to the present embodiment will be described. Note that the following description will assume a radio communication system where a plurality of local areas are arranged in a wide area (see FIG. 14). Assume that this radio communication system adopts the above-described second HetNet configuration, and that, in the local areas, a local area carrier (second carrier frequency) that has a wider bandwidth than the wide area carrier in a different frequency band from that of the wide area carrier (first carrier frequency) is used.

Figure 8:
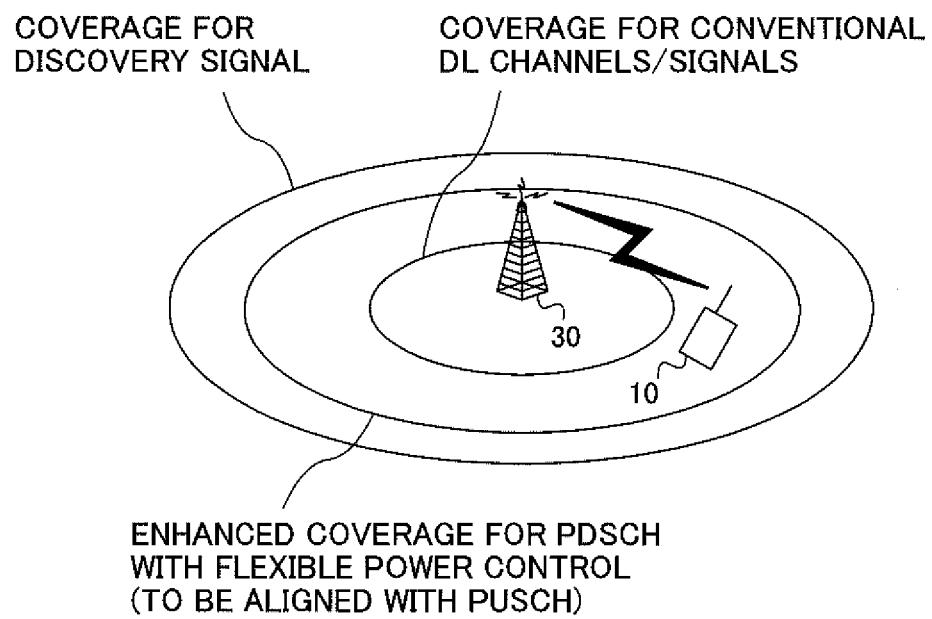
FIG. 8 is a conceptual diagram of transmission power control in the downlink of a local area.

FIG. 8 is a conceptual diagram of the transmission power control in the downlink of the local areas according to the present embodiment. As shown in FIG. 8, in the downlink of a local area, the discovery signal is transmitted with certain transmission power so as to maximize the coverage. By means of this, more mobile terminal apparatuses 10 are able to detect the discovery signal.

Meanwhile, in FIG. 8, the transmission power of downlink signals such as the EPDCCH (enhanced downlink control signal) and the PDSCH (downlink data signal) is controlled adaptively. For example, as for downlink signals for a mobile terminal apparatus 10 located near a local area base station apparatus 30, a local area carrier (see FIG. 4) having a wide bandwidth and low transmission power may be used as is, to secure high capacity while maintaining small coverage. As for downlink signals for a mobile terminal apparatus 10 located at a distance from a local area base station apparatus 30, the transmission power of the local area carrier (see FIG. 4) may be increased by narrowing the bandwidth, and the capacity may be reduced by expanding the coverage.

Next, the radio communication method in the downlink of the local areas according to the present embodiment will be described with reference to FIG. 9 and FIG. 10.

Figure 9:
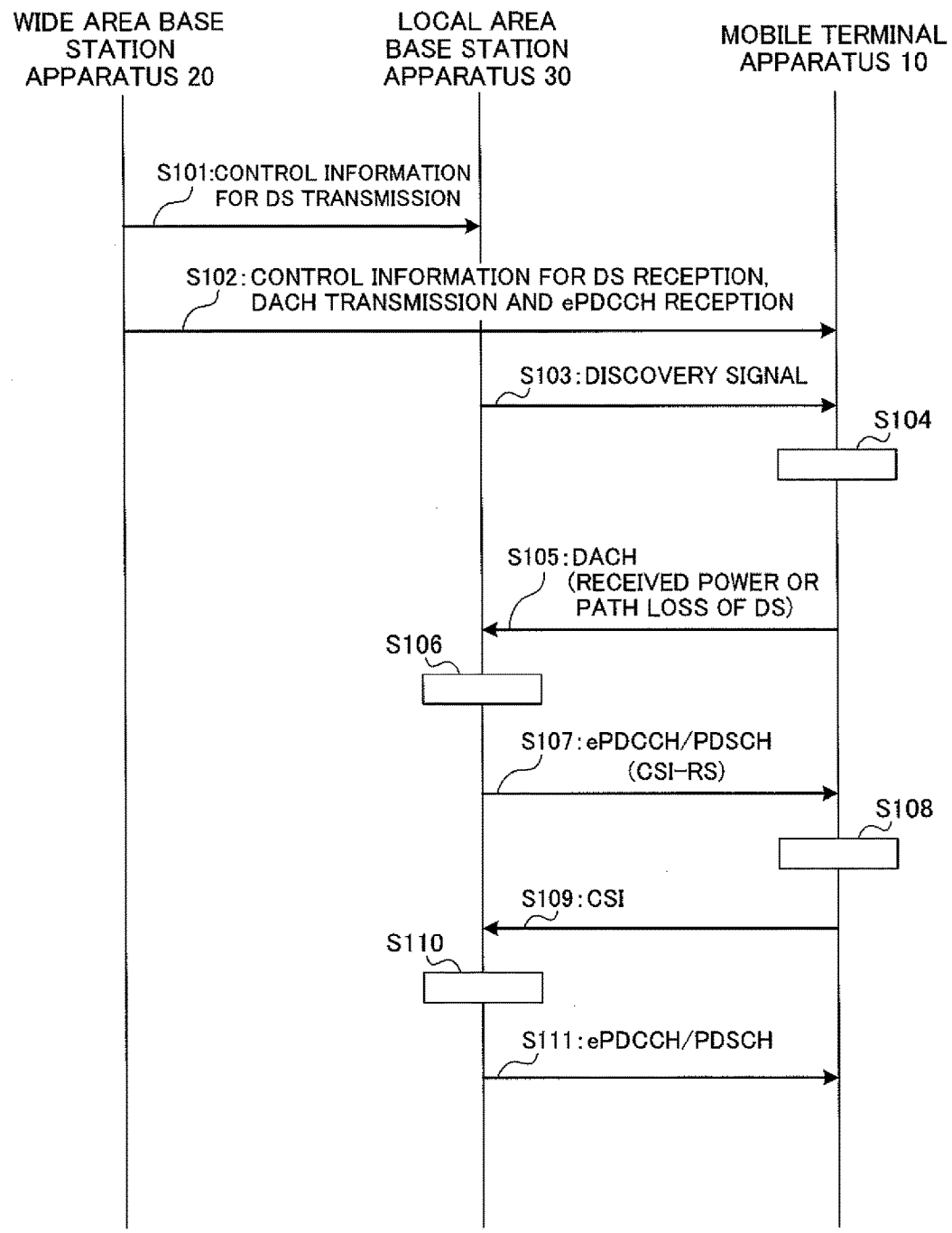
FIG. 9 is a sequence diagram to show a radio communication method in the downlink of a local area according to a first example.

FIG. 9 is a sequence diagram to show the radio communication method in the downlink of the local areas according to a first example. Referring to FIG. 9, although the wide area base station apparatus 20 and a local area base station apparatus 30 are connected via a wire interface such as an X2 interface, they may be connected via a radio interface as well. Also, assume that a mobile terminal apparatus 10 is connected with the wide area base station apparatus 20 and a local area base station apparatus 30 via a radio interface.

As shown in FIG. 9, a local area base station apparatus 30 receives control information for discovery signal (DS) transmission from the wide area base station apparatus 20 (step S101). The control information for discovery signal transmission includes, for example, radio resources and a signal sequence for transmitting the discovery signal. Note that every local area is provided with a signal sequence of a discovery signal, and the local area is identified with this signal sequence.

The mobile terminal apparatus 10 receives local area control information, including, for example, control information for discovery signal (DS) reception, control information for DACH transmission, and control information for EPDCCH reception, from the wide area base station apparatus 20 (step S102).

Here, the control information for discovery signal reception includes radio resources, signal sequence and so on for receiving the discovery signal from the local area base station apparatus 30. The control information for discovery signal reception may include the transmission power of the discovery signal from the local area base station apparatus 30. Also, the control information for DACH transmission includes the radio resources, the DM-RS sequence and so on allocated to the DACH. The control information for EPDCCH reception includes the radio resources, the DM-RS sequence and so on for receiving downlink control information (DCI) using an EPDCCH from the local area base station apparatus 30.

The mobile terminal apparatus 10 receives the discovery signal from the local area base station apparatus 30 based on the control information for discovery signal reception received in step S102, and measures the received power of these discovery signal (step S103). As described above, the discovery signal is transmitted in a predetermined cycle from the local area base station apparatus 30 (for example, in a cycle of several seconds). Note that, for the received power of the discovery signal, for example, the SINR (Signal-to-Interference and Noise power Ratio) of the discovery signal is used.

The mobile terminal apparatus 10 calculates the path loss of the discovery signal based on the received power of the discovery signal (step S104). To be more specific, the mobile terminal apparatus 10 calculates the difference between the transmission power value of the discovery signal received from the wide area base station apparatus 20 in step S102, and the received power value of the discovery signal measured in step S103, as the path loss of the discovery signal.

The mobile terminal apparatus 10 transmits the received power or path loss of the discovery signal to the local area base station apparatus 30, using the DACH, based on the control information for DACH transmission received in step S102 (step S105). Here, the initial transmission power of the DACH may be determined based on the path loss calculated in step S104. For example, the initial transmission power of the DACH may be the value adding a predetermined offset to the above path loss, equal to or lower than the maximum transmission power of the mobile terminal apparatus 10.

The local area base station apparatus 30 determines the initial transmission power of downlink signals for the mobile terminal apparatus 10 based on the path loss of the discovery signal at the mobile terminal apparatus 10 (step S106). For example, the initial transmission power of downlink signals may be the value adding a predetermined offset to the above path loss, equal to or lower than the maximum transmission power of the local area base station apparatus 30. Note that the downlink signals, the initial transmission power of which is to be determined, may be the EPDCCH (enhanced downlink control signal) and the PDSCH (downlink data signal) that are frequency-division-multiplexed.

Note that the path loss of the discovery signal may be calculated in the mobile terminal apparatus 10 and transmitted to the local area base station apparatus 30, or may be calculated in the local area base station apparatus 30. The local area base station apparatus 30 receive the received power value of the discovery signal from the mobile terminal apparatus 10, calculates the path loss of the discovery signal from the received power value as received and the transmission power value of the discovery signal, and determined the initial transmission power of downlink signals from the path loss calculated.

The local area base station apparatus 30 transmits the downlink signals with the initial transmission power determined in step S106 (step S107). To be more specific, the local area base station apparatus 30 transmits the EPDCCH and the PDSCH with the initial transmission power represented by initial transmission power information from the wide area base station apparatus 20. Based on the DCI (Downlink Control Information) transmitted using the EPDCCH, the mobile terminal apparatus 10 identifies and receives the PDSCH allocated to the mobile terminal apparatus 10.

Note that a CSI-RS (Channel State Information Reference Signal) is multiplexed over the downlink signals transmitted from the local area base station apparatus 30. The CSI-RS refers to a measurement reference signal for measuring the channel state between the local area base station apparatus 30 and the mobile terminal apparatus 10.

The mobile terminal apparatus 10 measures the received power of the CSI-RS multiplexed upon the downlink signals, and generates CSI (Channel State Information) based on the measured received power (step S108). The received power of the CSI-RS may be, for example, the SINR (Signal-to-Interference and Noise power Ratio) of the CSI-RS.

The CSI refers to channel state information that represents the channel state between the mobile terminal apparatus 10 and the local area base station apparatus 30, such as a CQI (Channel Quality Indicator), a PMI (Precoding Matrix Indicator), an RI (Rank Indicator) and so on. The CQI refers to a value that is calculated based on the SINR of the CSI-RS from the local area base station apparatus 30, and every value is associated with a modulation and coding scheme (MCS).

The mobile terminal apparatus 10 transmits the CSI generated in step S108 to the local area base station apparatus 30 (step S109). Note that this transmission of CSI may be carried out using a PUCCH (Physical Uplink Control Channel, which is an uplink control signal) or may be carried out using a PUSCH (Physical Uplink Shared Channel, which is an uplink data signal).

The local area base station apparatuses 30 determine the transmission power of downlink signals based on the CSI received from the mobile terminal apparatus 10 in step S109 and the above-described path loss of the discovery signal (step S110). The downlink signals, the transmission power of which is to be determined, may be the EPDCCH and the PDSCH that are frequency-division-multiplexed. Note that the local area base station apparatus 30 may determine the offset value for the current downlink signal transmission power based on the above CSI and path loss.

Also, the local area base station apparatus 30 may determine the modulation coding scheme (MCS) to apply to the downlink signals based on the CQI received from the mobile terminal apparatus 10 in step S109.

The local area base station apparatus 30 transmits the downlink signals with the transmission power determined in step S110 (step S111). The local area base station apparatus 30 may also transmit the downlink signals by the MCS determined based on the CQI.

As described above, with the radio communication method in the downlink of a local area according to the first example shown in FIG. 9, even in the downlink of a local area, the transmission power of downlink signals is controlled adaptively based on the path loss of the discovery signal. In this way, by controlling the transmission power of a local area carrier not only in the uplink of the local area, but also in the downlink the local area as well, it becomes possible to make the uplink and downlink coverages in the local area nearly symmetrical.

Also, with the radio communication method in the downlink of a local area according to the first example shown in FIG. 9, the local area base station apparatus 30, which the mobile terminal apparatus 10 connects with, determines the transmission power of downlink signals. Consequently, compared to the case of determining transmission power in the wide area base station apparatus 20, it is possible to control the transmission power of downlink signals more quickly.

Figure 10:
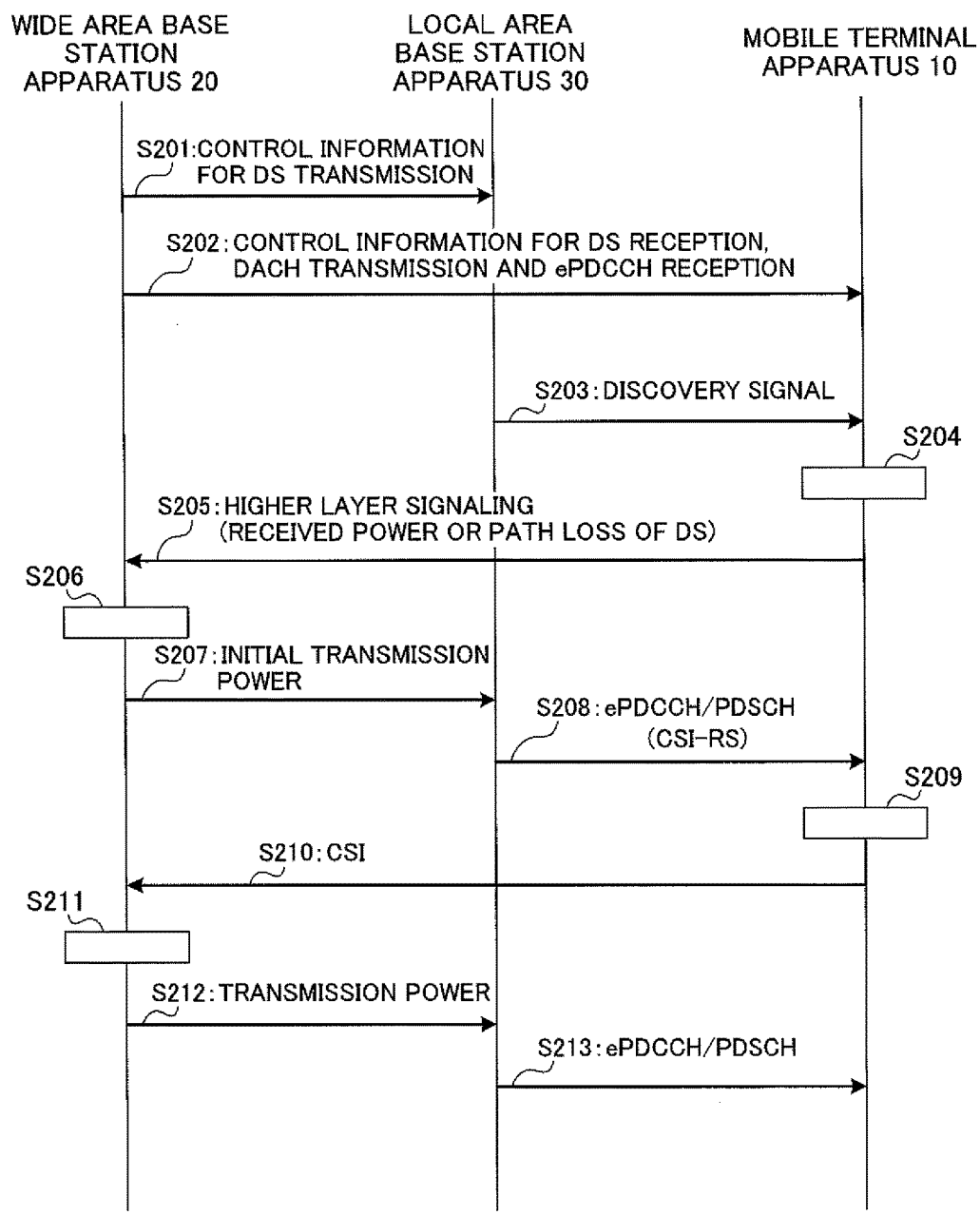
FIG. 10 is a sequence diagram to show a radio communication method in the downlink of a local area according to a second example.

FIG. 10 is a sequence diagram to show the radio communication method in the downlink of a local area according to a second example. The radio communication method shown in FIG. 10 is different from the radio communication method shown in FIG. 9 in that the initial transmission power and transmission power of downlink signals is determined in the wide area base station apparatus 20, not in the local area base station apparatus 30. Now, differences from FIG. 9 will be described mainly.

Note that, in FIG. 10, connection (for example, higher layer connection such as RRC connection) is established between the mobile terminal apparatus 10 and the wide area base station apparatus 20. Also, steps S201 to S204 of FIG. 10 are the same as steps S101 to S104 of FIG. 9.

As shown in FIG. 10, the mobile terminal apparatus 10 transmits the received power or path loss of the discovery signal to the wide area base station apparatus 20 using higher layer signaling such as RRC signaling (step S205).

The wide area base station apparatus 20 determines the initial transmission power of downlink signals from the local area base station apparatus 30 to the mobile terminal apparatus 10 based on the path loss of the discovery signal in the mobile terminal apparatus 10 (step S206). For example, the initial transmission power of downlink signals from the local area base station apparatus 30 may be a value adding a predetermined offset to the above path loss, equal to or lower than the maximum transmission power of the local area base station apparatus 30. Note that the downlink signals, the initial transmission power of which is to be determined, may be the EPDCCH and the PDSCH that are frequency-division-multiplexed.

Note that the path loss of the discovery signal may be calculated in the mobile terminal apparatus 10 and transmitted to the wide area base station apparatus 20, or may be calculated in the wide area base station apparatus 20. The wide area base station apparatus 20 receive the received power value of the discovery signal from the mobile terminal apparatus 10, calculates the path loss of the discovery signal from the received power value as received and the transmission power value of the discovery signal, and determined the initial transmission power of downlink signals from the path loss calculated.

The wide area base station apparatus 20 transmits transmission power information to represent the determined initial transmission power to the local area base station apparatus 30 via a wire interface such as an X2 interface (step S207).

The local area base station apparatus 30 transmits downlink signals with the initial transmission power represented by the transmission power information from the wide area base station apparatus 20 (step S208). To be more specific, the local area base station apparatus 30 transmits at least one of the EPDCCH and the PDSCH with the initial transmission power represented by the transmission power information from the wide area base station apparatus 20.

The mobile terminal apparatus 10 measures the received power of the CSI-RS multiplexed over the downlink signals, and, based on the received power measured, generates CSI including a CQI and so on (step S209).

The mobile terminal apparatus 10 transmits the CSI generated in step S209 to the wide area base station apparatus 20 (step S210). Note that this transmission of CSI may be carried out using higher layer signaling such as RRC signaling.

The wide area base station apparatus 20 determines the transmission power of downlink signals from the local area base station apparatus 30 to the mobile terminal apparatus 10 based on the CSI received from the mobile terminal apparatus 10 in step S210 and the path loss of the discovery signal described above (step S211). Note that the downlink signals from the local area base station apparatus 30, the transmission power of which is to be determined, may be the EPDCCH and the PDSCH that are frequency-divisionmultiplexed. Note that the local area base station apparatus 30 may determine the offset value for the current downlink signal transmission power from the local area base station apparatus 30 based on the above CSI and path loss.

Also, the wide area base station apparatus 20 may determine the modulation coding scheme (MCS) to apply to the downlink signals from the local area base station apparatus 30 based on the CQI received from the mobile terminal apparatus 10 in step S210.

The wide area base station apparatus 20 transmits transmission power information to represent the determined transmission power to the local area base station apparatus 30 via a wire interface such as an X2 interface (step S212). Also, the wide area base station apparatus 20 may transmit MCS information to represent the determined MCS to the local area base station apparatus 30.

The local area base station apparatus 30 transmits downlink signals with the transmission power represented by the transmission power information from the wide area base station apparatus 20 (step S213). Also, the local area base station apparatus 30 may transmit downlink signals including the EPDCCH and the PDSCH by the MCS represented by the MCS information from the wide area base station apparatus 20.

With the radio communication method in the downlink of a local area according to the second example shown in FIG. 10, the wide area base station apparatus 20, which forms the wide area where the local area base station apparatus 30 is arranged, determines the transmission power of downlink signals. By this means, it is possible to determine more optimal downlink signal transmission power taking into account the load balance between the local areas and so on. Also, by allowing the wide area base station apparatus 20 to determine the transmission power of downlink signals for the local area base station apparatus 30 under the wide area base station apparatus 20, downlink signal transmission power control in CoMP (Coordinated Multiple Point) is made possible. Note that, the radio communication methods of FIG. 9 and FIG. 10 may be combined, by, for example, combining step S108 and earlier steps in FIG. 9 and step S210 and later steps in FIG. 10, or step S209 and earlier steps in FIG. 10 and step S109 and later steps in FIG. 9, and so on.

Next, a CSI reporting scheme that is suitable with the transmission power control scheme in the downlink of a local area according to the present embodiment will be described with reference to FIG. 11.

Figure 11:
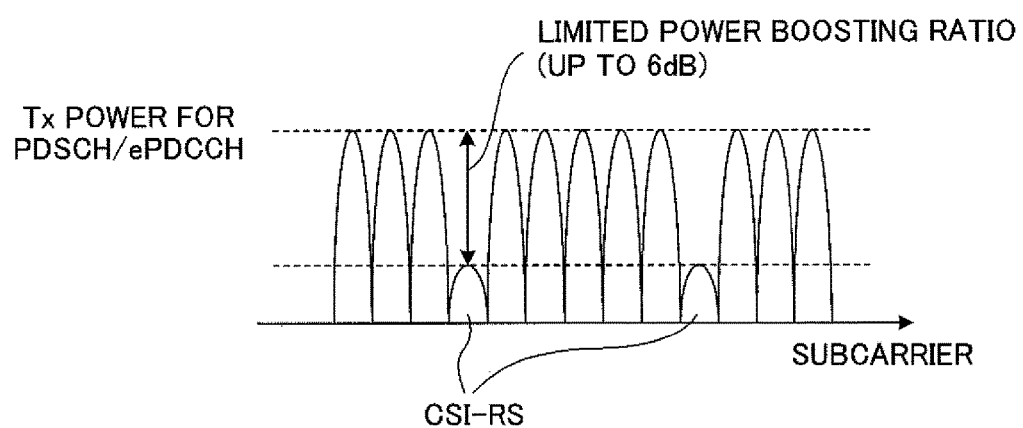
FIG. 11 is a diagram to show difference in transmission power between the PDSCH/EPDCCH and the CSI-RS.

FIG. 11 is a diagram to show downlink signal transmission power that is subject to adaptive control in a local area according to the present embodiment. As shown in FIG. 11, in the local area according to the present embodiment, the transmission power of the EPDCCH or the PDSCH increases adaptively, while the transmission power of the CSI-RS is kept constant. The CSI-RS is used in channel estimation in the mobile terminal apparatus, so that it is preferable to maintain the transmission power of the CSI-RS constant so that channel state variations can be detected.

In the case shown in FIG. 11, the transmission power difference between the CSI-RS having transmission power that is kept low, and the EPDCCH or the PDSCH having transmission power that increases adaptively, increases. By this means, the received power difference between the CSI-RS and the EPDCCH or the PDSCH at the mobile terminal apparatus 10 increases.

For example, although the SINR of the CSI-RS becomes poorer at −5 dB and below, the adaptive control of the transmission power of the EPDCCH or the PDSCH may make the SINR of the EPDCCH or the PDSCH good at +5 dB and above, and the received power difference between the CSI-RS and the EPDCCH or the PDSCH may increase. In this case, the CQI that is measured using the CSI-RS becomes dissimilar to the actual received quality of the EPDCCH or the PDSCH, and therefore the accuracy of link adaptation (MCS selection) based on the CQI may decrease. So, it may be possible to employ CSI reporting schemes such as ones described below.

With a first CSI reporting scheme, the difference (ΔS) between the adaptively-controlled transmission power of the EPDCCH or the PDSCH, and the transmission power of the CSI-RS allocated to the same resource blocks with this EPDCCH or PDSCH is reported in advance from the wide area base station apparatus 20 or the local area base station apparatus 30 to the mobile terminal apparatus 10.

For example, the transmission power difference ΔS may be reported from the wide area base station apparatus 20 in step S102 of FIG. 9 or in step S202 of FIG. 10. Alternatively, the transmission power difference ΔS may be reported from the local area base station apparatus 30 in the access step triggered by the DACH. Based on the transmission power difference ΔS reported, the mobile terminal apparatus 10 corrects the CQI value calculated using the SINR of the CSI-RS and reports CSI including the corrected CQI. For example, the mobile terminal apparatus 10 corrects the CQI value to add ΔS to the SINR of the CSI-RS.

With the first CSI reporting scheme, it is possible to prevent a CQI of low accuracy from being reported and damaging the accuracy of link adaptation (MCS selection), without changing the conventional CQI configuration.

With a second CSI reporting scheme, the measurement range of CQIs (channel quality indicators) using the received power of the CSI-RS is expanded. For example, it may be possible to expand the measurement range of CQIs so as to be able to cope with cases up to where the SINR of the CSI-RS is −20 dB. A conventional CQI is identified with a CQI index, which is given in 16 ranks from 0 to 15, and four bits are secured for the CQI index. With the second CSI reporting scheme, the number of CQI index bits is further expanded, and the CQI index value to correspond to the expanded measurement range is reported. By this means, even when the CQI that is measured using the CSI-RS becomes somewhat dissimilar to the actual received quality of the EPDCCH or the PDSCH, it is possible to keep the CQI within the CQI measurement range, so that the accuracy of link adaptation (MCS selection) based on the CQI improves.

With the second CSI reporting scheme, without reporting the transmission power difference ΔS between the EPDCCH or the PDSCH and the CSI-RS, it is possible to report a CQI of high accuracy and prevent the accuracy of link adaptation from decreasing.

Next, a CSI-RS arrangement configuration that is suitable for the transmission power control scheme in the downlink of a local area according to the present embodiment will be described with reference to FIG. 12 and FIG. 13.

Figure 12A:
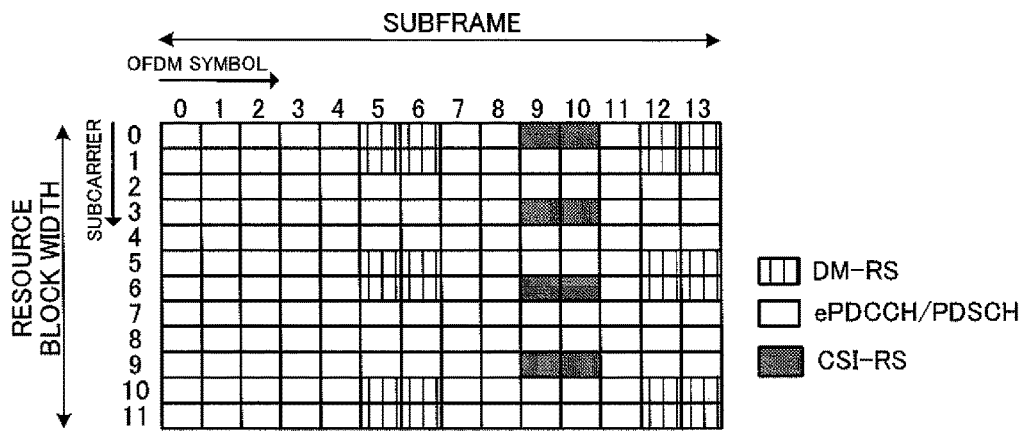
FIG. 12 provides diagrams to show examples of CSI-RS arrangement configuration.

FIG. 12 is a diagram to show an example of a CSI-RS arrangement configuration in a local area according to the present embodiment. In the local area, the CSI-RS is transmitted using a local area carrier having a wide bandwidth and low transmission power (see FIG. 4). As described above, unlike the EPDCCH or the PDSCH, the CSI-RS is not subject to adaptive transmission power control. Consequently, when the CSI-RS is transmitted in using a local area carrier, the mobile terminal apparatus 10 is unable to receive the CSI-RS with sufficient received power, and therefore the accuracy of CSI-RS measurement deteriorates. So, as shown in FIG. 12A, it may be possible to insert the CSI-RS in increased density.

FIG. 12A shows an example of a CSI-RS arrangement configuration in a subframe where the density of insertion is increased. As shown in FIG. 12A, the CSI-RS to be transmitted in a local area is arranged at shorter subcarrier intervals than the subcarrier intervals at which the CSI-RS to be transmitted in the wide area is arranged, in specific OFDM symbols in a sub frame.

For example, in FIG. 12A, the CSI-RS is arranged every three subcarriers in the ninth and tenth OFDM symbols from the top of the subframe. In the wide area, in the event of two antenna ports, the CSI-RS is arranged every 12 subcarriers. Consequently, with the arrangement shown in FIG. 12A, the density of the CSI-RS to be inserted increases more in the local area than in the wide area.

As shown in FIG. 12A, by making the subcarrier interval to arrange the CSI-RS smaller and increasing the density of the CSI-RS to insert, it is possible to prevent the accuracy of CSI-RS measurement in the mobile terminal apparatus 10 from decreasing even when the CSI-RS is transmitted using a local area carrier having a wide bandwidth and having transmission power that becomes lower.

Also, as shown in FIG. 11, it may be possible that, when the EPDCCH or the PDSCH with transmission power that increases adaptively and the CSI-RS are arranged in neighboring subcarriers, the power boost of the EPDCCH or the PDSCH is prevented. So, it may be possible to arrange the CSI-RS as shown in FIG. 12B and FIG. 12C.

Figure 12B:
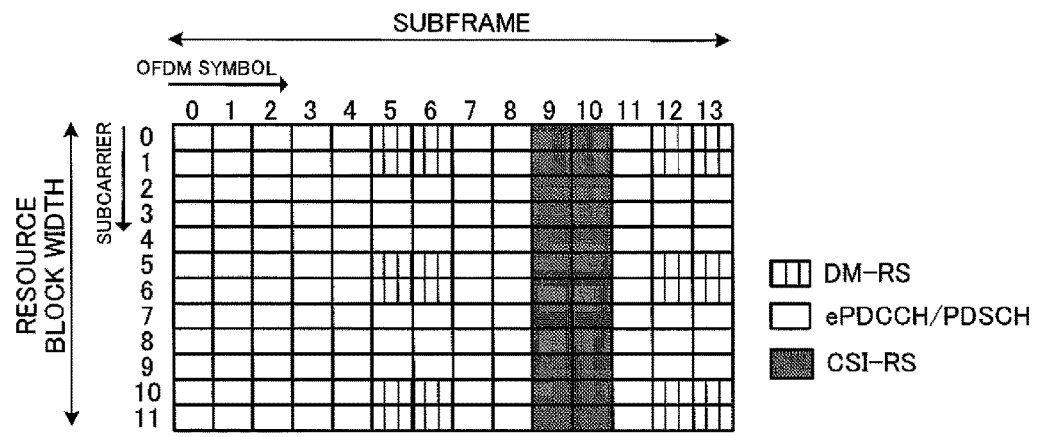

In FIG. 12B, an example of arrangement configuration where specific OFDM symbols in a subframe are occupied with the CSI-RS. As shown in FIG. 12B, the CSI-RS to be transmitted in a local area are arranged in all subcarriers constituting the resource block width in specific OFDM symbol in a subframe.

In the arrangement configuration shown in FIG. 12B, in specific OFDM symbols in a subframe, the EPDCCH or the PDSCH with transmission power that increases adaptively and the CSI-RS with constantly low transmission power are never arranged in neighboring subcarrier. Consequently, it is possible to prevent the CSI-RS from blocking the power boost of the EPDCCH or the PDSCH. Also, since the CSI-RS is arranged in all the subcarriers constituting the resource block width, so that, even when the CSI-RS is transmitted using a local area carrier of a wide bandwidth, it is still possible to prevent the decrease of the accuracy of CSI-RS measurement in the mobile terminal apparatus 10.

Figure 12C:
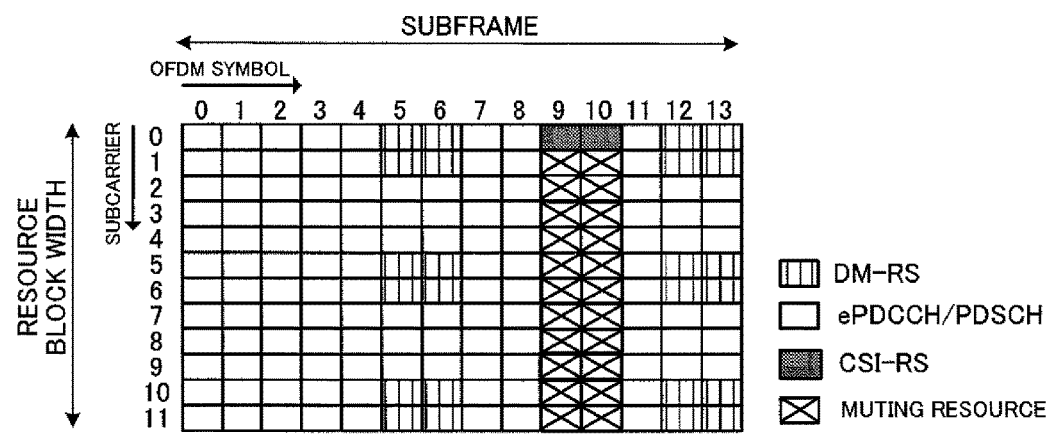

In FIG. 12C shows an example of arrangement configuration where, in specific OFDM symbols in a subframe, the CSI-RS and the EPDCCH or the PDSCH are prevented from being frequency-division-multiplexed. As shown in FIG. 12C, the CSI-RS that is transmitted in a local area are arranged in part of the subcarriers constituting the resource block width, in specific OFDM symbols in a subframe. At this time, muting resources (zero-power CSI-RS) are arranged in the rest of the subcarriers so that the PDSCH is not arranged in the rest of the subcarriers.

In the arrangement configuration shown in FIG. 12C, in specific OFDM symbols in a subframe, muting resources are arranged in subcarriers where the CSI-RS is not arranged. Consequently, in specific OFDM symbols in a subframe, the EPDCCH or the PDSCH with transmission power that increases adaptively and the CSI-RS with constantly low transmission power are never arranged in neighboring subcarrier. As a result, it is possible to prevent the CSI-RS from blocking the power boost of the EPDCCH or the PDSCH.

Note that the CSI-RS arrangements shown in FIG. 12A to FIG. 12C are simply examples, and are by no means limiting. For example, in FIG. 12A to FIG. 12C, the CSI-RS may be arranged in OFDM symbols apart from the ninth and tenth OFDM symbols in the subframe. Also, in FIG. 12A, if the subcarrier interval to arrange the CSI-RS is shorter than in the wide area, the CSI-RS may be arranged in any subcarriers. Also, in FIG. 12C, in specific OFDM symbols in a subframe, if muting resources are arranged in subcarriers where the CSI-RS is not arranged, the CSI-RS may be arranged in any subcarriers.

Also, as shown in FIG. 12A to FIG. 12C, a local area is studied not to arrange the PDCCH in maximum three OFDM symbols from the top of a subframe. Consequently, the CSI-RS may be arranged in this resource region. Also, the arrangement configuration for the DM-RS, which is a UE-specific demodulation reference signal, is not limited to the arrangements shown in FIG. 12A to FIG. 12C either.

Figure 13:
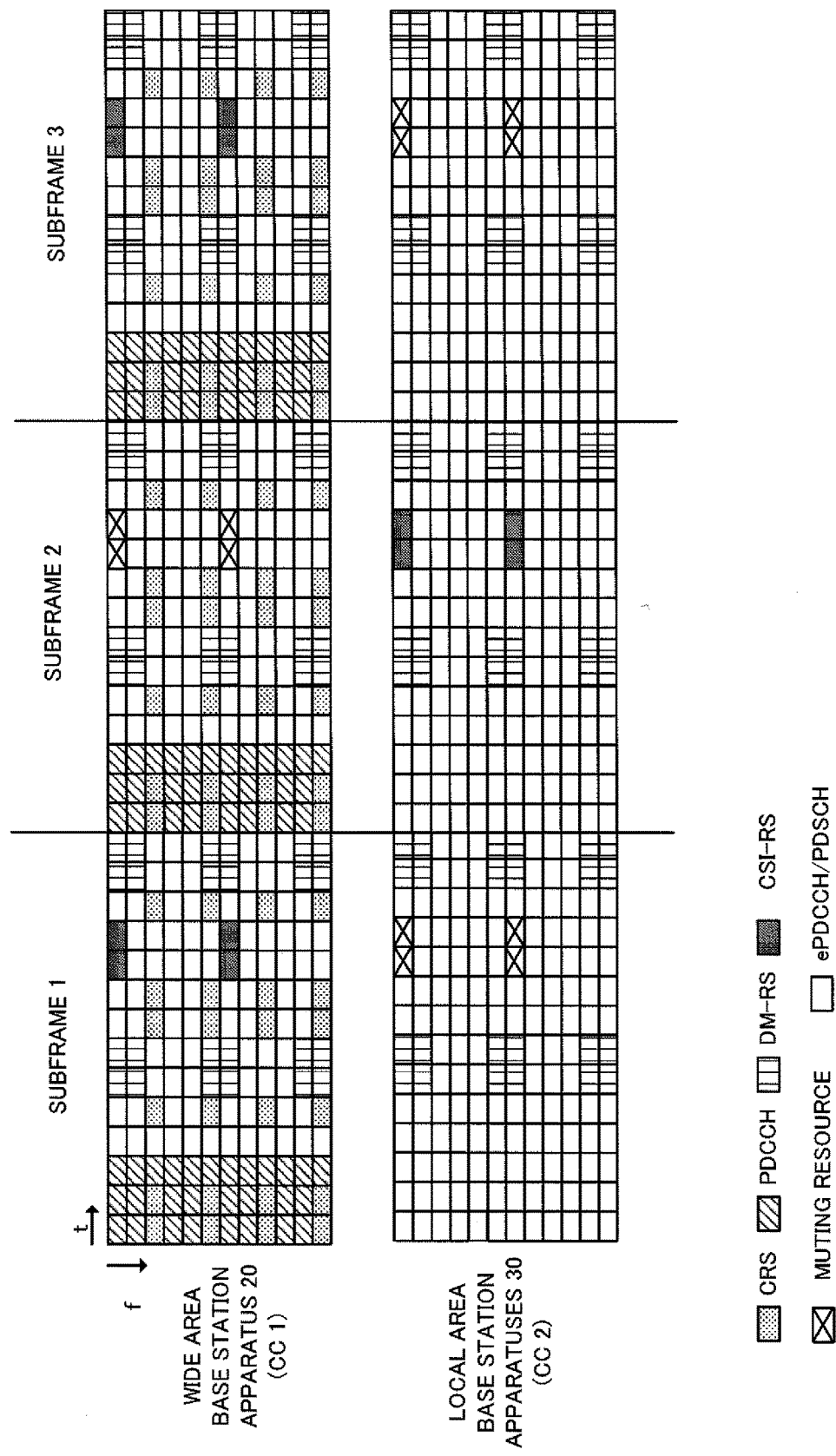
FIG. 13 provides diagrams to show examples of CSI-RS arrangement configuration.

FIG. 13 is a diagram to show an example of a CSI-RS arrangement configuration where carrier aggregation is executed between a wide area and a local area. When carrier aggregation is executed between the wide area base station apparatus 20 and a local area base station apparatus 30, it may occur that the wide area carrier and the local area carrier described above with reference to FIG. 4 belong to different component carriers.

In this case, as shown in FIG. 13, the CSI-RS that is transmitted in the local area may be arranged in a subframe apart from the subframe where the CSI-RS to be transmitted in the wide area is arranged. For example, in FIG. 13, the CSI-RS of the wide area is arranged in subframes 1 and 3, while the CSI-RS of the local area is arranged in subframe 2.

When carrier aggregation is executed, the component carrier (CC 1) of the wide area and the component carrier (CC 2) of the local area have different frequency bands. Consequently, by arranging CSI-RSs in different subframes between component carriers, it becomes possible to realize frequency hopping virtually.

Note that the CSI-RS arrangements shown in FIG. 13 are simply examples, and are by no means limiting. For example, in FIG. 13, the CSI-RS may be arranged in OFDM symbols apart from the ninth and tenth OFDM symbols in a subframe. Also, given a specific OFDM symbol, the CSI-RS may be arranged in any subcarriers.

Figure 14:
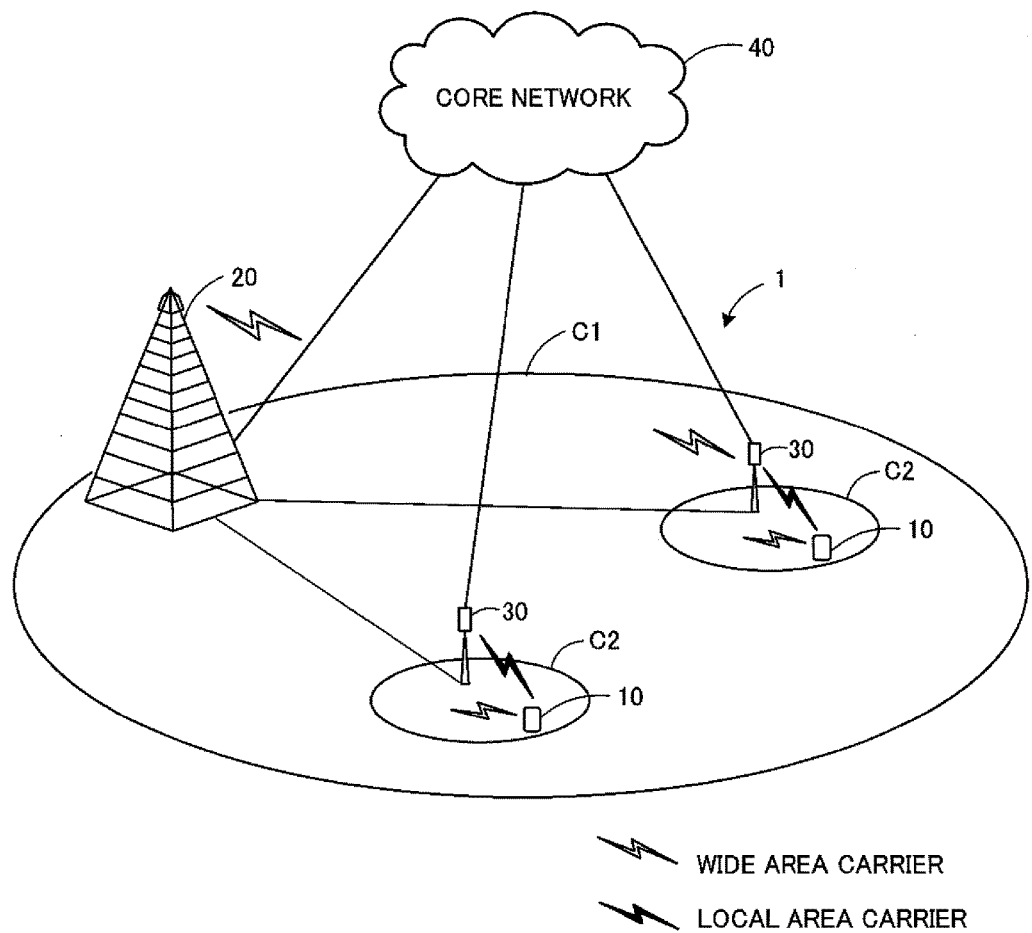
FIG. 14 is a diagram to explain an example of a system configuration of a radio communication system.

Now, the radio communication system according to the present embodiment will be described in detail. FIG. 14 is a diagram to explain a system configuration of the radio communication system according to the present embodiment. Note that the radio communication system shown in FIG. 14 is a system to accommodate, for example, the LTE system or SUPER 3G. In this radio communication system, carrier aggregation to group a plurality of fundamental frequency blocks as one, where the system band of the LTE system is one unit, is used. Also, this radio communication system may be referred to as "IMT-Advanced," or may be referred to as "4G," "FRA" (Future Radio Access) and so on.

As shown in FIG. 14, the radio communication system 1 has a wide area base station apparatus 20, which forms a wide area C1, and a plurality of local area base station apparatuses 30, which each form a local area C2 that is arranged in the wide area C1 and that is narrower than the wide area C1. Also, in the wide area C1 and each local area C2, many mobile terminal apparatuses 10 are arranged. The mobile terminal apparatuses 10 support the radio communication schemes for the wide area and for the local areas, and are configured to be able to perform radio communication with the wide area base station apparatus 20 and the local area base station apparatuses 30.

Communication between the mobile terminal apparatuses 10 and the wide area base station apparatus 20 is carried out using a wide area carrier (for example, a carrier having a narrow bandwidth in a low frequency band). Communication between a mobile terminal apparatus 10 and a local area base station apparatus 30 is carried out using a local area carrier (for example, a carrier having a wide bandwidth in a high frequency band). Also, the wide area base station apparatus 20 and each local area base station apparatus 30 are connected with each other by wire connection or by wireless connection.

The wide area base station apparatus 20 and each local area base station apparatus 30 are connected with a higher station apparatus, which is not illustrated, and are connected to a core network 40 via the higher station apparatus. Note that the higher station apparatus may be, for example, an access gateway apparatus, a radio network controller (RNC), a mobility management entity (MME) and so on, but is by no means limited to these. Also, the local area base station apparatuses 30 may be connected with the higher station apparatus via the wide area base station apparatus 20.

Note that, although each mobile terminal apparatus 10 may be either an LTE terminal or an LTE-A terminal, in the following description, simply a mobile terminal apparatus will be described, unless specified otherwise. Also, although a mobile terminal apparatus will be described to perform radio communication with the wide area base station apparatus 20 and the local area base station apparatuses 30 for ease of explanation, more generally, user equipment (UE), including both mobile terminal apparatuses and fixed terminal apparatuses, may be used as well. Also, the wide area base station apparatus 20 and the local area base station apparatuses 30 may be referred to as wide area and local area transmission points.

In the radio communication system, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels in the LTE system will be described. Downlink communication channels include a PDSCH (Physical Downlink Shared Channel), which is used by each mobile terminal apparatus 10 on a shared basis, and downlink L1/L2 control channels (PDCCH, PCFICH, PHICH). User data and higher control information are transmitted by the PDSCH. Scheduling information and so on for the PDSCH and the PUSCH are transmitted by the PDCCH (Physical Downlink Control Channel). The number of OFDM symbols to use for the PDCCH is transmitted by the PCFICH (Physical Control Format Indicator Channel). HARQ ACK and NACK for the PUSCH are transmitted by the PHICH (Physical Hybrid-ARQ Indicator Channel). Also, in the LTE-A system, scheduling information for the PDSCH and the PUSCH and so on are transmitted by the EPDCCH (enhanced Physical Downlink Control Channel).

Uplink communication channels include a PUSCH (Physical Uplink Shared Channel), which is used by each mobile terminal apparatus on a shared basis as an uplink data channel, and a PUCCH (Physical Uplink Control Channel), which is an uplink control channel. User data and higher control information are transmitted by this PUSCH. Also, downlink radio quality information (CQI: Channel Quality Indicator), ACK/NACK and so on are transmitted by the PUCCH.

Figure 15:
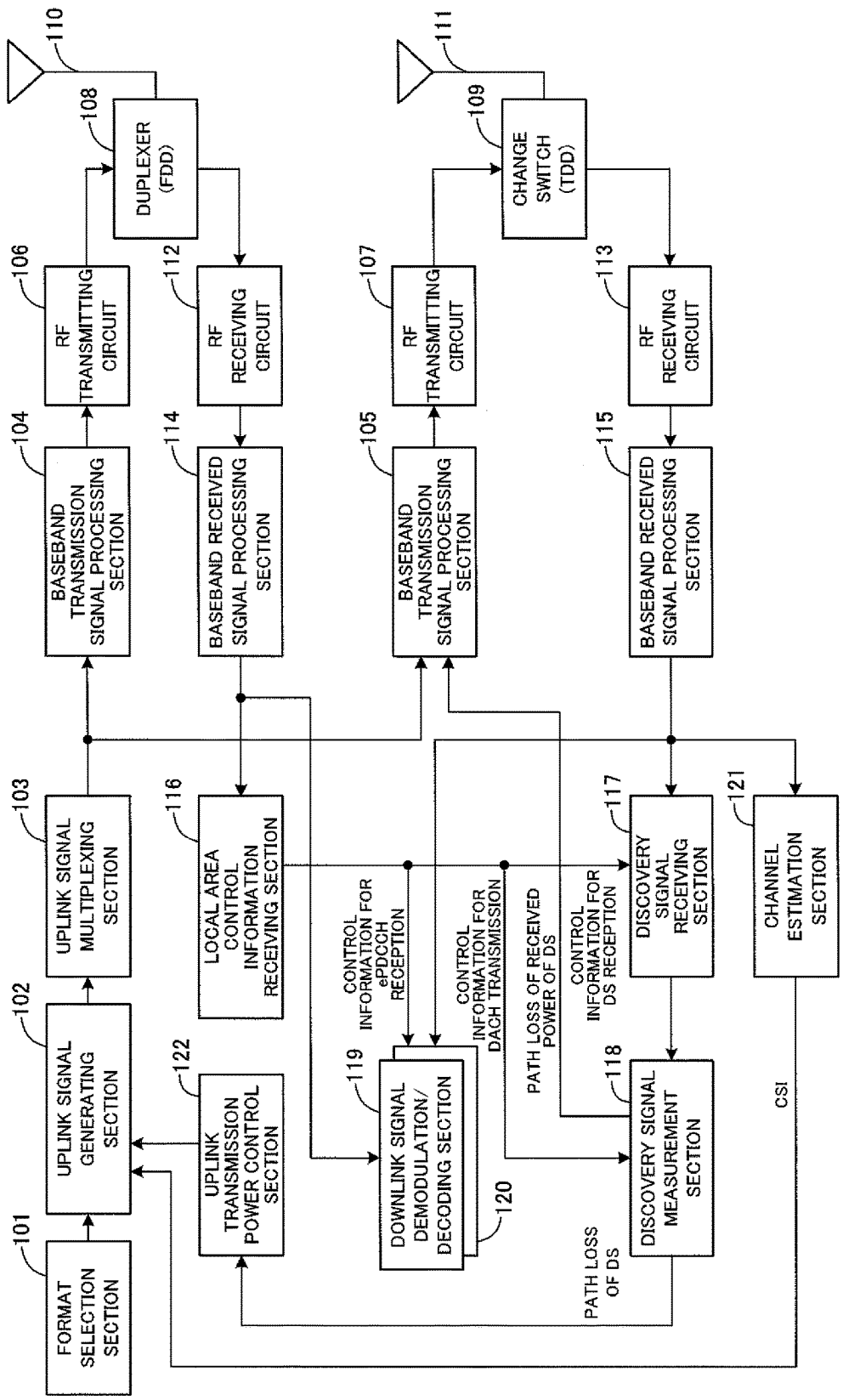
FIG. 15 is a diagram to show a configuration of a mobile terminal apparatus.

An overall configuration of a mobile terminal apparatus 10 will be described with reference to FIG. 15. A mobile terminal apparatus 10 has, as processing sections of the transmitting sequence, a format selection section 101, an uplink signal generating section 102, an uplink signal multiplexing section 103, baseband transmission signal processing sections 104 and 105, and RF transmitting circuits 106 and 107.

The format selection section 101 selects the transmission format for the wide area and the transmission format for the local areas. The uplink signal generating section 102 generates uplink data signals and reference signals. In the event of the transmission format for the wide area, the uplink signal generating section 102 generates the uplink data signal and reference signals for the wide area base station apparatus 20. Also, in the event of the transmission format for the local areas, the uplink signal generating section 102 generates the uplink data signal and reference signals for a local area base station apparatus 30.

The uplink signal multiplexing section 103 multiplexes the uplink transmission data and the reference signals. An uplink signal for the wide area base station apparatus 20 is input in the baseband transmission signal processing section 104, and subjected to digital signal processing. For example, in the event of an uplink signal of the OFDM scheme, the signal is converted from a frequency domain signal into a time sequence signal through an inverse fast Fourier transform (IFFT), and has cyclic prefixes inserted therein. Then, the uplink signal passes the RF transmitting circuit 106, and is transmitted from a transmitting/receiving antenna 110 for the wide area, via a duplexer 108 that is provided between the transmitting sequence and the receiving sequence. In the transmitting/receiving sequences for the wide area, simultaneous transmission/reception is made possible by the duplexer 108.

An uplink signal for a local area base station apparatus 30 is input in the baseband transmission signal processing section 105, and subjected to digital signal processing. For example, in the event of an uplink signal of the OFDM scheme, the signal is converted from a frequency domain signal into a time sequence signal through an inverse fast Fourier transform (IFFT), and has cyclic prefixes inserted therein. Then, the uplink signal passes the RF transmitting circuit 107, and is transmitted from a transmitting/receiving antenna 111 for the wide area, via a change switch 109 that is provided between the transmitting sequence and the receiving sequence. In the transmitting/receiving sequences for the local areas, transmission and reception are switched by a change switch 109.

Note that, although the present embodiment is configured to provide the duplexer 108 in the transmitting/receiving sequences for the wide area and provide the change switch 109 in the transmitting/receiving sequences for the local areas, this configuration is by no means limiting. It is equally possible to provide the change switch 109 in the wide area transmitting/receiving sequences and provide the duplexer 108 in the local area transmitting/receiving sequences. Also, uplink signals for the wide area and the local areas may be transmitted simultaneously from the transmitting/receiving antennas 110 and 111, or may be transmitted separately by switching between the transmitting/receiving antennas 110 and 111.

Also, the mobile terminal apparatus 10 has, as processing sections of the receiving sequence, RF receiving circuits 112 and 113, baseband received signal processing sections 114 and 115, a local area control information receiving section 116, a discovery signal receiving section 117, a discovery signal measurement section 118, and downlink signal demodulation/decoding sections 119 and 120.

A downlink signal from the wide area base station apparatus 20 is received at the wide area transmitting/receiving antenna 110. This downlink signal is input in the baseband received signal processing section 114 via the duplexer 108 and the RF receiving circuit 112, and subjected to digital signal processing. For example, in the event of a downlink signal of the OFDM scheme, the cyclic prefixes are removed, and the signal is converted from a time sequence signal to a frequency domain signal through a fast Fourier transform (FFT).

The local area control information receiving section 116 receives local area control information from the downlink signal for the wide area. Here, as the local area control information, control information for discovery signal (DS) reception, control information for DACH transmission, and control information for EPDCCH reception are received. The local area control information receiving section 116 outputs the control information for discovery signal (DS) reception to the discovery signal receiving section 117, outputs the control information for DACH transmission to the discovery signal measurement section 118, and outputs the control information for EPDCCH reception to the downlink signal demodulation/decoding section 120. Note that the local area control information is received from wide area base station apparatus 20 by means of, for example, higher layer signaling such as RRC signaling, and broadcast information.

The downlink data signal for the wide area is input in the downlink signal demodulation/decoding section 119, and decoded (descrambled) and demodulated in the downlink signal demodulation/decoding section 119. A downlink signal from the local area base station apparatus 30 is received in the transmitting/receiving antenna 111 for the local areas. This downlink signal is input in the baseband received signal processing section 115 via the change switch 109 and the RF receiving circuit 113, and is subjected to digital signal processing. For example, in the event of a downlink signal of the OFDM scheme, the cyclic prefixes are removed, and the signal is converted from a time sequence signal to a frequency domain signal through a fast Fourier transform (FFT).

The discovery signal receiving section 117 receives the discovery signal from the local area base station apparatus 30 based on the control information for discovery signal (DS) reception input from the wide area control information receiving section 116. The control information for discovery signal reception includes, for example, radio resource information and signal sequence information for receiving the discovery signal from the local area base station apparatus 30. The radio resource information includes, for example, the transmission interval, the frequency position, and the code of the discovery signal.

The discovery signal measurement section 118 measures the received power of the discovery signal received in the discovery signal receiving section 117. As the received power of the discovery signal, for example, the SINR (Signal-to-Interference and Noise power Ratio) may be measured.

Also, the discovery signal measurement section 118 may calculate the path loss of the discovery signal based on the received power of the discovery signal. For example, the discovery signal measurement section 118 calculates the path loss of the discovery signal based on the difference between the transmission power value of the discovery signal and the received power value that is measured. In this case, the transmission power of the discovery signal may be received from the wide area base station apparatus 20 as local area control information or may be received from the local area base station apparatus 30. The calculated path loss is output to the uplink transmission power control section 122.

The received power of the discovery signal measured in the discovery signal measurement section 118 and the path loss that is calculated is transmitted from the local area base station apparatus 30 using the DACH. Transmission by means of the DACH is carried out with the initial transmission power determined in an uplink transmission power control section 122, which will be described later.

Transmission by means of the DACH is carried out based on the control information for DACH transmission input from the local area control information receiving section 116. The control information for DACH transmission includes, for example, radio resource information and DM-RS sequence information for transmission to the local area base station apparatus 30 by means of the DACH. The radio resource information includes, for example, the transmission interval, the frequency position, and the code of the DACH. The transmission time interval of the DACH may be set shorter than the transmission time interval for the discovery signal so that the DACH is transmitted more frequently than the discovery signal, or may be set the same. In the DACH, user IDs may be transmitted with the discovery signal measurement result.

Note that the received power or path loss of the discovery signal may be transmitted to the local area base station apparatus 30 using uplink channels (for example, the PUCCH and the PUCCH) apart from the DACH, using higher layer signaling, and so on. Also, both the received power and the path loss of the discovery signal may be transmitted to the local area base station apparatus 30. Also, the received power or the path loss of the discovery signal may be transmitted to the wide area base station apparatus 20 using higher layer signaling. Also, both the received power and the path loss of the discovery signal may be transmitted to the wide area base station apparatus 20 or to the local area base station apparatus 30.

The channel estimation section 121 performs channel estimation based on the received power of the measurement reference signal (CSI-RS) from the local area base station apparatus 30. Note that, for the received power of the CSI-RS, for example, the SINR (Signal-to-Interference and Noise power Ratio) may be used.

Also, the channel estimation section 121 generates channel state information (CSI), which represents the estimated channel state. This CSI includes a CQI (Channel Quality Indicator), a PMI (Precoding Matrix Indicator), an RI (Rank Indicator) and so on. The CSI is transmitted to the local area base station apparatus 30 using the PUCCH or the PUSCH. Note that the CSI may be transmitted to the wide area base station apparatus 20. Also, the CQI is calculated based on the SINR of the CSI-RS. This CQI may be corrected based on the transmission power difference between the CSI-RS and the EPDCCH or the PDSCH reported in advance from the wide area base station apparatus 20 or the local area base station apparatus 30. Alternatively, the CQI may have an expanded measurement range (expanded number of feedback bits) so that the SINR of the CSI-RS up to −20 dB can be measured, for example.

A downlink data signal for the local areas is input in a downlink signal demodulation/decoding section 120, and decoded (descrambled) and demodulated in the downlink signal demodulation/decoding section 120. Also, based on the control information for EPDCCH reception input from the wide area control information receiving section 116, the downlink signal demodulation/decoding section 120 decodes (descrambles) and demodulates the enhanced downlink control signal (EPDCCH) for the local area. The control information for EPDCCH reception includes, for example, radio resource information and DM-RS sequence information for reception from the local area base station apparatus 30 by means of the EPDCCH. The radio resource information includes, for example, the transmission interval, the frequency position, and the code of the EPDCCH.

Also, downlink signals for the wide area and the local areas may be received simultaneously from the transmitting/receiving antennas 110 and 111, or may be received separately by switching between the transmitting/receiving antennas 110 and 111.

The uplink transmission power control section 122 controls the transmission power of uplink signals for the local area base station apparatus 30. To be more specific, the uplink transmission power control section 122 determines the initial transmission power of the DACH based on the path loss of the discovery signal. For example, the uplink transmission power control section 122 adds a predetermined offset to the above path loss, at or below the maximum transmission power of the mobile terminal apparatus 10, and determines the initial transmission power of the DACH. Also, the uplink transmission power control section 122 determines the transmission power of the uplink data signal (PUSCH) based on the channel estimation result in the channel estimation section 121. Note that the uplink transmission power control section 122 may control the transmission power of the uplink data signal (PUSCH) based on command information (for example, TPC commands) from the local area base station 30.

Figure 16:
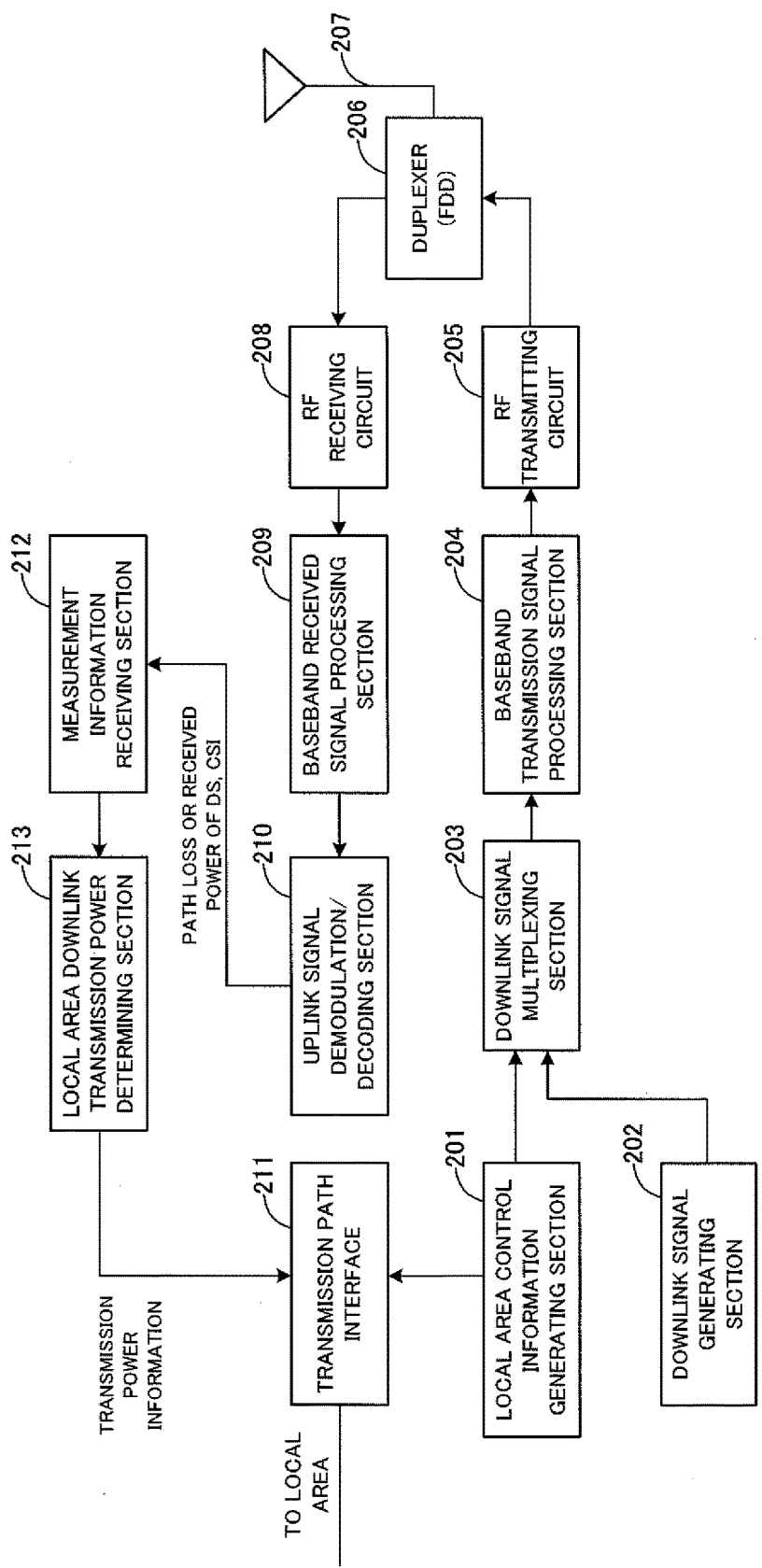
FIG. 16 is a diagram to show a configuration of a wide area base station apparatus.

An overall configuration of the wide area base station apparatus 20 will be described with reference to FIG. 16. The wide area base station apparatus 20 has, as processing sections of the transmitting sequence, a local area control information generating section 201, a downlink signal generating section 202, a downlink signal multiplexing section 203, a baseband transmission signal processing section 204, and an RF transmitting circuit 205.

The local area control information generating section 201 generates, as local area control information, control information for discovery signal (DS) transmission, control information for discovery signal (DS) reception, control information for DACH transmission, and control information for EPDCCH reception. The local area control information generating section 201 outputs the control information for discovery signal transmission to a transmission path interface 211, and outputs the control information for discovery signal reception, the control information for DACH transmission, and the control information for EPDCCH reception to the downlink signal multiplexing section 203. The control information for discovery signal transmission is transmitted to the local area base station apparatus 30 via the transmission path interface 211. Meanwhile, the control information for discovery signal reception, the control information for DACH transmission, and the control information for EPDCCH reception are transmitted to the mobile terminal apparatus 10 via the downlink signal multiplexing section 203.

The downlink signal generating section 202 generates the downlink data signal (PDSCH) and reference signals. The downlink signal multiplexing section 203 multiplexes the local area control information, the downlink data signal (PDSCH) and the reference signals. A downlink signal for the mobile terminal apparatus 10 is input in the baseband transmission signal processing section 204, and subjected to digital signal processing. For example, in the event of a downlink signal of the OFDM scheme, the signal is converted from a frequency domain signal to a time sequence signal through an inverse fast Fourier transform (IFFT), and has cyclic prefixes inserted therein. Then, the downlink signal passes the RF transmitting circuit 205, and is transmitted from the transmitting/receiving antenna 207 via a duplexer 206 that is provided between the transmitting sequence and the receiving sequence.

Also, the wide area base station apparatus 20 has, as processing sections of the receiving sequence, an RF receiving circuit 208, a baseband received signal processing section 209, an uplink signal demodulation/decoding section 210, a measurement information receiving section 212, and a local area downlink transmission power determining section 213.

An uplink signal from the mobile terminal apparatus 10 is received in the transmitting/receiving antenna 207, and is input in the baseband received signal processing section 209 via the duplexer 206 and the RF receiving circuit 208. In the baseband received signal processing section 209, the uplink signal is subjected to digital signal processing. For example, in the event of an uplink signal of the OFDM scheme, the cyclic prefixes are removed, and the signal is converted from a time sequence signal to a frequency domain signal through a fast Fourier transform (FFT). The uplink data signal is input in the uplink signal demodulation/decoding section 210, and decoded (descrambled) and demodulated in the uplink signal demodulation/decoding section 210.

The measurement information receiving section 212 receives the measurement information transmitted from the mobile terminal apparatus 10 through higher layer signaling. To be more specific, the measurement information receiving section 212 receives the received power or path loss of the discovery signal in the mobile terminal apparatus 10. The measurement information receiving section 212 may calculate the path loss based on the difference between the transmission power value and the received power value of the discovery signal from the local area base station apparatus 30. The measurement information receiving section 212 outputs the path loss of the discovery signal to the local area downlink transmission power determining section 213.

Also, the measurement information receiving section 212 acquires channel state information (CSI) that is estimated based on the received power of the measurement reference signal (CSI-RS) in the mobile terminal apparatus 10. The measurement information receiving section 212 outputs the acquired CSI to the local area downlink transmission power determining section 213.

The local area downlink transmission power determining section 213 determines the transmission power of downlink signals from the local area base station apparatus 30 to the mobile terminal apparatus 10. To be more specific, the local area downlink transmission power determining section 213 determines the initial transmission power of downlink signals based on the path loss of the discovery signal. Also, the local area downlink transmission power determining section 213 determines the transmission power of downlink signals based on CSI and the path loss of the discovery signal. The local area downlink transmission power determining section 213 transmits transmission power information, which represents the transmission power that is determined, to the local area base station apparatus 30, via the transmission path interface 211.

Note that the downlink signals, the transmission power of which is to be determined, may be the downlink data signal (PDSCH) from the local area base station apparatus 30, enhanced downlink control signal (EPDCCH) and so on. Also, when the transmission power of downlink signals is determined in the local area base station apparatus 30, the local area downlink transmission power determining section 213 may be omitted.

Figure 17:
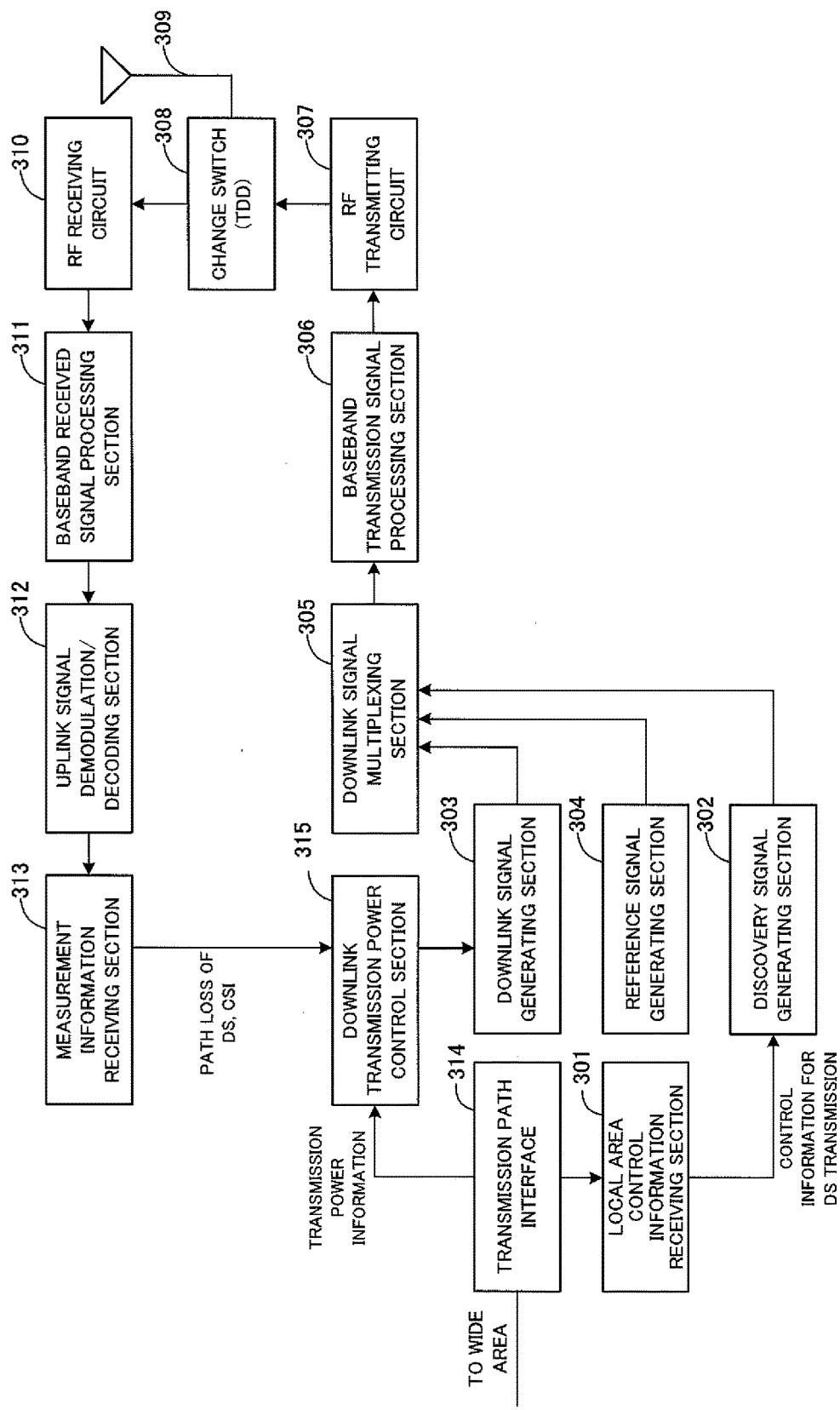
FIG. 17 is a diagram show a configuration of a local area base station apparatus.

An overall configuration of the local area base station apparatus 30 will be described with reference to FIG. 17. Assume that the local area base station apparatus 30 is arranged very close to the mobile terminal apparatus 10. The local area base station apparatus 30 has, as processing sections of the transmitting sequence, a local area control information receiving section 301, a discovery signal generating section 302, a downlink signal generating section 303, a reference signal generating section 304, a downlink signal multiplexing section 305, a baseband transmission signal processing section 306, and an RF transmitting circuit 307.

The local area control information receiving section 301 receives local area control information from the wide area base station apparatus 20 via the transmission path interface 314. Here, for the local area control information, control information for discovery signal transmission is received. The local area control information receiving section 301 outputs the control information for discovery signal transmission to the discovery signal generating section 302.

The discovery signal generating section 302 generates the discovery signal (detection signal), which is used to detect a local area base station apparatus 30 in the mobile terminal apparatus 10, based on the control information for discovery signal (DS) transmission input from the local area control information receiving section 301. The control information for discovery signal reception includes, for example, radio resource information and signal sequence information for receiving the discovery signal from the local area base station apparatus 30. The radio resource information includes, for example, the transmission interval, the frequency position, and the code of the discovery signal. Note that the transmission power of the discovery signal is set to a fixed value so as to have wider coverage than downlink signals, which will be described later.

The downlink signal generating section 303 generates downlink signals for the mobile terminal apparatus 10. To be more specific, the downlink signal generating section 303 generates the downlink data signal (PDSCH) and the enhanced downlink control signal (EPDCCH) to be frequency-division-multiplexed upon the downlink data signal (PDSCH). The transmission power of the downlink data signal and the downlink control signal is controlled adaptively by a downlink transmission power control section 315, which will be described later.

The reference signal generating section 304 outputs reference signals such as the measurement reference signal (CSI-RS) and the demodulation reference signal (DM-RS), and outputs these to the downlink signal multiplexing section 305. The transmission power of the measurement reference signal (CSI-RS) is used in channel state estimation in the mobile terminal apparatus 10, and therefore is set to a fixed value.

Also, the measurement reference signal (CSI-RS) is multiplexed with downlink signals in the downlink signal multiplexing section 305, and, in the baseband transmission signal processing section 306, arranged in a predetermined radio resource region using a predetermined arrangement pattern. For example, the CSI-RS may be arranged at shorter subcarrier intervals than the CSI-RS that is transmitted in the wide area, in specific OFDM symbols in a subframe, as shown in FIG. 12A. Also, as shown in FIG. 12B, the CSI-RS may be arranged in all the subcarriers constituting the resource block width in specific OFDM symbols in a subframes. Also, as shown in FIG. 12C, the CSI-RS may be arranged in part of the subcarriers constituting the resource block width in specific OFDM symbols in a subframe, and muting resources may be arranged in the rest of the subcarriers. Also, when the wide area carrier and the local area carrier belong to different component carriers by means of carrier aggregation, the CSI-RS of the local area may be arranged in a subframe that is different from the subframe where the CSI-RSs that is transmitted in the wide area is arranged, as shown in FIG. 13.

The downlink signal multiplexing section 305 multiplexes the downlink signals generated in the downlink signal generating section 303 and the reference signals generated in the reference signal generating section 304. The downlink signals multiplexed with the reference signals are input in the baseband transmission signal processing section 306, and subject to digital signal processing. For example, in the event of a downlink signal of the OFDM scheme, the signal is converted from a frequency domain signal to a time sequence signal through an inverse fast Fourier transform (IFFT), and has cyclic prefixes inserted therein. Then, the downlink signal passes the RF transmitting circuit 307, and is transmitted from a transmitting/receiving antenna 309 via the change switch 308 that is provided between the transmitting sequence and the receiving sequence. Note that a duplexer may be provided instead of the change switch 308.

The local area base station apparatus 30 has, as processing sections of the receiving sequence, an RF receiving circuit 310, a baseband received signal processing section 311, an uplink signal demodulation/decoding section 312, and a measurement information receiving section 313.

An uplink signal from the mobile terminal apparatus 10 is received in the transmitting/receiving antenna 309 for the local areas, and input in the baseband received signal processing section 311 via the change switch 308 and the RF receiving circuit 310. In the baseband received signal processing section 311, the uplink signal is subjected to digital signal processing. For example, in the event of an uplink signal of the OFDM scheme, the cyclic prefixes are removed, and the signal is converted from a time sequence signal to a frequency domain signal through a fast Fourier transform (FFT). The uplink data signal is input in the uplink signal demodulation/decoding section 312, and decoded (descrambled) and demodulated in the uplink signal demodulation/decoding section 312.

The measurement information receiving section 313 receives measurement information of the discovery signal. To be more specific, the measurement information receiving section 313 receives the received power or the path loss of the discovery signal transmitted from the mobile terminal apparatus 10. The measurement information receiving section 313 may calculate the path loss based on the difference between the transmission power value and the received power value of the discovery signal. The measurement information receiving section 313 outputs the path loss of the discovery signal to the downlink transmission power control section 315.

Also, the measurement information receiving section 313 receives the channel state information (CSI) estimated in the mobile terminal apparatus 10 based on the received power of the measurement reference signal (CSI-RS). The measurement information receiving section 313 outputs the acquired CSI to the downlink transmission power control section 315.

The downlink transmission power control section 315 controls the transmission power of downlink signals for the mobile terminal apparatus 10. To be more specific, the initial transmission power of downlink signals is determined based on the path loss of the discovery signal input from the measurement information receiving section 313. Also, the downlink transmission power control section 315 determines the transmission power of downlink signals based on the CSI and the path loss of the discovery signal. The downlink transmission power control section 315 controls the downlink signal generating section 303 so that downlink signals are transmitted with the determined transmission power. Note that the downlink signals, the transmission power of which is to be determined, may be the downlink data signal (PDSCH), the enhanced downlink control signal (EPDCCH) and so on. Note that the downlink transmission power control section 315 may control the transmission power of the downlink signals based on command information (for example, TPC commands) from the mobile terminal apparatus 10 in closed loop control.

Also, the downlink transmission power control section 315 may determine the initial transmission power and the transmission power of downlink signals for the mobile terminal apparatus 10 based on transmission power information received from the wide area base station apparatus 20 via the transmission path interface 314.

As described above, with the radio communication system 1 according to the present embodiment, the transmission power of downlink signals is controlled adaptively, even in the downlink of a local area, based on the path loss of the discovery signal. In this way, by controlling the transmission power of a local area carrier not only in the uplink of the local area, but also in the downlink the local area as well, it becomes possible to make the uplink and downlink coverages in the local area nearly symmetrical. Consequently, it is possible to provide highly efficient local area radio access that is specifically designed for local areas.

The present invention is by no means limited to the above embodiment and can be implemented in various modifications. For example, without departing from the scope of the present invention, it is possible to adequately change the number of carriers, the bandwidth of carriers, the signaling method, the type of the additional carrier type, the number of processing sections, the order of processing steps in the above description, and implement the present invention. Also, FIG. 4 is simply an example, and it is equally possible to use a carrier of a high frequency band in the wide area as well. Besides, the present invention can be implemented with various changes, without departing from the scope of the present invention.

The disclosure of Japanese Patent Application No. 2012-087672, filed on Apr. 6, 2012, including the specification, drawings and abstract, is incorporated herein by reference in its entirety.

The invention claimed is:

1. A mobile terminal apparatus comprising:
a measurement section configured to measure reception power of a discovery signal that is periodically transmitted in a given cycle to the mobile terminal apparatus from a radio base station that is able to turn downlink transmission on and off; and
a control section configured to control transmission power of an uplink signal to the radio base station based on a path loss that is calculated based on a measured reception power value of the discovery signal,
wherein the measurement section calculates the path loss based on a difference between a transmission power value of the received discovery signal and the measured reception power value of the discovery signal.

2. The mobile terminal apparatus according to claim 1, further comprising a receiving section configured to receive the transmission power value of the discovery signal by higher layer signaling.

3. The mobile terminal apparatus according to claim 1, wherein the discovery signal is transmitted in a longer cycle than a detection signal that is used to detect another radio base station that is unable to turn downlink transmission on and off.

4. The mobile terminal apparatus according to claim 1, further comprising a transmission section configured to transmit the measured reception power value of the discovery signal by higher layer signaling.

5. The mobile terminal apparatus according to claim 1, wherein the uplink signal is an access channel to the radio base station.

6. A radio base station that is able to turn downlink transmission on and off, comprising:
a transmission section configured to periodically transmit a discovery signal in a given cycle to a mobile terminal apparatus; and
a receiving section configured to receive an uplink signal from the mobile terminal apparatus,
wherein transmission power of the uplink signal is controlled based on a path loss that is calculated based on a reception power value of the discovery signal, and
wherein the path loss is calculated based on a difference between a transmission power value of the discovery signal and the reception power value of the discovery signal.

7. The radio base station according to claim 6, wherein the transmission section transmits the discovery signal in a longer cycle than a detection signal that is used to detect another radio base station that is unable to turn downlink transmission on and off.

8. The radio base station according to claim 6, wherein the uplink signal is an access channel to the radio base station.

9. A radio communication method for a mobile terminal apparatus communicating with a radio base station that is able to turn downlink transmission on and off, the radio communication method comprising the steps of:
in the mobile terminal apparatus,
measuring reception power of a discovery signal that is periodically transmitted in a given cycle from the radio base station to the mobile terminal apparatus; and
controlling transmission power of an uplink signal to the radio base station based on a path loss that is calculated based on a measured reception power value of the discovery signal,
wherein the path loss is calculated based on a difference between a transmission power value of the received discovery signal and the measured reception power value of the discovery signal.

* * * * *

UNITED STATES PATENT AND TRADEMARK OFFICE
CERTIFICATE OF CORRECTION

PATENT NO. : 9,813,996 B2  Page 1 of 1
APPLICATION NO. : 14/390405
DATED : November 7, 2017
INVENTOR(S) : Kishiyama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 102 days.

Signed and Sealed this
Twenty-fifth Day of September, 2018

Andrei Iancu
*Director of the United States Patent and Trademark Office*